(12) United States Patent
Nygren et al.

(10) Patent No.: US 11,635,370 B2
(45) Date of Patent: Apr. 25, 2023

(54) GAS IMAGING SYSTEMS AND METHODS

(71) Applicant: FLIR Systems AB, Täby (SE)

(72) Inventors: Hakan E. Nygren, Upplands (SE); Jonas Sandsten, Lomma (SE); Per Lilja, Täby (SE); Marta Barenthin-Syberg, Stockholm (SE); Henning Hagman, Täby (SE); Eric A. Kurth, Santa Barbara, CA (US); Brian B. Simolon, Santa Barbara, CA (US); Naseem Y. Aziz, Goleta, CA (US); Ulf Wallgren, Lidingo (SE)

(73) Assignee: FLIR Systems AB, Täby (SE)

(*) Notice: Subject to any disclaimer, the term of this patent is extended or adjusted under 35 U.S.C. 154(b) by 591 days.

(21) Appl. No.: 16/586,809

(22) Filed: Sep. 27, 2019

(65) Prior Publication Data

US 2020/0025679 A1 Jan. 23, 2020

Related U.S. Application Data

(63) Continuation of application No. PCT/US2018/025585, filed on Mar. 30, 2018.

(Continued)

(51) Int. Cl.
  *G01N 21/3504* (2014.01)
  *H04N 5/33* (2023.01)
  *G06T 5/50* (2006.01)

(52) U.S. Cl.
  CPC ........... *G01N 21/3504* (2013.01); *H04N 5/33* (2013.01); *G06T 5/50* (2013.01); *G06T 2207/10048* (2013.01); *G06T 2207/20224* (2013.01)

(58) Field of Classification Search
  CPC ........ G01N 21/3504; H04N 5/33; G06T 5/50; G06T 2207/10048; G06T 2207/20224
  (Continued)

(56) References Cited

U.S. PATENT DOCUMENTS 6,969,856 B1 * 11/2005 Hillenbrand ......... H04N 5/2254
                                                  348/E5.09
8,653,461 B1 * 2/2014 Benson .................. G01J 5/061
                                                  250/339.01

(Continued)

FOREIGN PATENT DOCUMENTS

CN      105447471 A      3/2016
EP      2942615   *  4/2015  ......... G01N 21/3504

(Continued)

OTHER PUBLICATIONS

Messinger, David. (2005). A method for quantification of gas plumes in thermal hyperspectral imagery. Proc SPIE. 5806. 218-228. 10.1117/12.603585. (Year: 2005).*

(Continued)

*Primary Examiner* — Clayton E. LaBalle
*Assistant Examiner* — Kevin C Butler
(74) *Attorney, Agent, or Firm* — Haynes and Boone, LLP

(57) ABSTRACT

An IR imaging device includes an optical element receiving infrared radiation from a scene, a filter blocking IR radiation outside of a particular range of wavelengths, an array of sensor pixels to capture an image of the scene based on infrared radiation received through the optical element and filter, the array of sensor pixels comprising a first array of sensor pixels to image gas in within a first spectral bandwidth, and a second array of sensor pixel to sense IR radiation in a second spectral bandwidth where gas is not detected, a read-out integrated circuit (ROIC) and logic circuitry to generate a first image sensed by the first array (Continued)

and a second image sensed by the second array, and gas detection logic to detect the presence of gas in the first image.

19 Claims, 13 Drawing Sheets

Related U.S. Application Data

(60) Provisional application No. 62/541,626, filed on Aug. 4, 2017, provisional application No. 62/480,234, filed on Mar. 31, 2017.

(58) Field of Classification Search
USPC .......................................................... 73/23.2
See application file for complete search history.

(56) References Cited

U.S. PATENT DOCUMENTS

| | | | | |
|---|---|---|---|---|
| 9,562,849 | B2* | 2/2017 | Kester | G01J 3/0208 |
| 9,599,508 | B2* | 3/2017 | Kester | G01J 3/36 |
| 9,756,263 | B2* | 9/2017 | Kester | H04N 5/2258 |
| 10,375,327 | B2* | 8/2019 | Kester | G01J 3/28 |
| 10,458,905 | B2* | 10/2019 | Kester | G01M 3/26 |
| 10,955,355 | B2* | 3/2021 | Kester | H04N 5/33 |
| 2005/0156111 | A1* | 7/2005 | Racca | G01M 3/38 |
| | | | | 250/338.5 |
| 2005/0189492 | A1* | 9/2005 | Milton | H04N 5/33 |
| | | | | 257/E27.131 |
| 2013/0016220 | A1* | 1/2013 | Brown | H04N 5/332 |
| | | | | 359/359 |
| 2014/0139643 | A1* | 5/2014 | Hogasten | H04N 5/33 |
| | | | | 348/48 |
| 2015/0136981 | A1* | 5/2015 | Kester | G01J 3/0229 |
| | | | | 250/330 |
| 2015/0316473 | A1* | 11/2015 | Kester | G06V 20/00 |
| | | | | 250/339.02 |
| 2015/0369730 | A1* | 12/2015 | Schmidt | G01N 33/0027 |
| | | | | 250/208.1 |
| 2016/0037089 | A1* | 2/2016 | Silny | H04N 5/332 |
| | | | | 250/332 |
| 2016/0349228 | A1* | 12/2016 | Kester | G01J 5/0014 |
| 2017/0363541 | A1* | 12/2017 | Sandsten | G01N 21/3518 |
| 2018/0011009 | A1* | 1/2018 | Sandsten | G01N 21/314 |
| 2018/0188163 | A1* | 7/2018 | Kester | G01N 21/3504 |
| 2018/0191967 | A1* | 7/2018 | Kester | G01J 5/026 |
| 2018/0335380 | A1* | 11/2018 | Schmidt | H04N 5/272 |
| 2019/0187019 | A1* | 6/2019 | Ekeroth | G01N 21/85 |
| 2019/0212261 | A1* | 7/2019 | Lannestedt | G01J 3/0208 |
| 2020/0003626 | A1* | 1/2020 | Pau | G01J 3/0208 |
| 2020/0025679 | A1* | 1/2020 | Nygren | G01N 21/3504 |
| 2020/0116583 | A1* | 4/2020 | Hedberg | H04N 5/33 |
| 2021/0218909 | A1* | 7/2021 | Schmidt | G01J 5/025 |
| 2021/0310941 | A1* | 10/2021 | Sandsten | G01J 5/0802 |
| 2021/0344851 | A1* | 11/2021 | Kester | G01J 3/0232 |
| 2021/0344852 | A1* | 11/2021 | Isberg | G01J 3/0297 |

FOREIGN PATENT DOCUMENTS

| | | | | |
|---|---|---|---|---|
| EP | | 2942615 A1 * | 11/2015 | ............ G01J 3/0205 |
| WO | WO 2016/138991 | | 9/2016 | |
| WO | WO-2016138991 A1 * | | 9/2016 | ............ G01J 3/0208 |
| WO | WO-2018075964 A1 * | | 4/2018 | ................ G01J 3/02 |
| WO | WO-2018156795 A1 * | | 8/2018 | ............ G01J 3/0232 |
| WO | WO-2018183973 A1 * | | 10/2018 | ......... G01N 21/3504 |

OTHER PUBLICATIONS

Pogorzala, David et al., Gas plume species identification in airborne LWIR imagery using constrained stepwise regression analyses, Algorithms and Technologies for Multispectral, Hyperspectral, and Ultraspectral Imagery XI, Proceedings of SPIE vol. 5806, 2005, pp. 195-205 (Year: 2005).*

Messinger, David, Gaseous plume detection in hyperspectral images: a comparison of methods, Algorithms and Technologies for Multispectral, Hyperspectral, and Ultraspectral Imagery X, Proceedings of SPIE vol. 5425, 2004, pp. 592-603 (Year: 2004).*

Manolakis, Dimitris et al., Hyperspectral Imaging Remote Sensing, Cambridge Univeristy Press (www.cambridge.com), 2016, pp. xi, 1-4, 57, 63, 82, 102, 106, 139, Table 3.1, section 3.8 p. 151 (Year: 2016).*

Smith, Randall B, Introduction to Hyperspectral Imaging, Microimages, Inc. (http://www.microimages.com), 1999-2012, pp. 2-23 (Year: 1999).*

Crastes, Arnaud, et al., "Uncooled infrared detector designed for Gas detection and High temperature measurements," AMA Conferences 2013—Sensor 2013, OPTO 2013, IRS 2013, pp. 20-23.

Jiménez, Jesús Manuel Gil, "Enagás' ongoing activities in R&D to reduce methane emissions", 2016.

Talghader, Joseph J., "Spectral selectivity in infrared thermal detection," Light: Science and Applications. 2012.

Wang, Lingxue, Gas imaging detectivity model combining leakage spot size and range, Proceedings of SPIE—The International Society for Optical Engineering, vol. 8354, 2012.

* cited by examiner

GAS IMAGING SYSTEMS AND METHODS

CROSS-REFERENCE TO RELATED APPLICATIONS

This application is a continuation of International Patent Application No. PCT/US2018/025585 filed Mar. 30, 2018 and entitled "GAS IMAGING SYSTEMS AND METHODS," which claims priority to and the benefit of U.S. Provisional Patent Application No. 62/480,234 filed Mar. 31, 2017 and entitled "UNCOOLED CAMERA SYSTEM OPTIMIZED FOR OPTICAL GAS IMAGING," and U.S. Provisional Patent Application No. 62/541,626 filed Aug. 4, 2017 and entitled "DUAL COLOR HIGH SENSITIVITY INFRARED SENSOR FOR GAS IMAGING," which are all hereby incorporated by reference in their entirety.

TECHNICAL FIELD

One or more embodiments of the present disclosure relate generally to infrared imaging and, in particular, to gas detection and/or visualization using infrared imaging systems and methods.

BACKGROUND

Infrared (IR) (e.g., thermal) images of scenes are often useful for monitoring, inspection and/or maintenance purposes, for example, for monitoring gas leaks at an industrial plant. An IR imaging device (e.g., an IR camera, a thermal camera, etc.) can capture IR image data representing infrared radiation emitted from an observed scene. The captured IR image can be processed, displayed and/or stored away, for example, in the IR imaging device or in a computing device connected to the IR imaging device such as a tablet computer, a smartphone, a laptop, or a desktop computer.

IR imaging devices are used for detecting the presence of gas, for example, in the form of a gas cloud or gas plume, and for producing a visual representation of the gas in an infrared image. A gas infrared image can be used for visualizing and monitoring gas leaks, for example. However, detection of gas using conventional uncooled IR imaging systems often suffer from having too low of a sensitivity to detect gas below a certain gas particle concentration. For example, the contrast between gas information and noise/interference and/or the contrast between gas information and the background modulation in a generated gas infrared image may be too low to effectively identify gas in the image. The contrast between gas information and the background modulations may be improved with the inclusion of a narrow bandpass filter, but noise is proportionally increased as a result of this change. For conventional IR imaging systems, there is typically no bandwidth that has a sufficiently high enough gas-background/span contrast and gas-noise contrast. The sensitivity may be further reduced by various physical aspects, such as varying temperatures and emissivity in the observed scene background, noise, other gases, aerosol particles, and moving gas clouds.

One approach for an IR imaging device to improve the ability to detect gas and reduce noise is to implement a cooled IR detector, where the imaging sensor is integrated with a cryocooler. The cryocooler lowers the sensor temperature to cryogenic temperatures, with the reduction in sensor temperature effectively reducing thermally-induced noise. However, cooled IR imaging devices are fragile, large in size, slow, costly, and difficult to use in hazardous locations. Thus, there is a continued need to improve the gas sensitivity of IR imaging devices. There is also a continued need to improve the IR sensitivity for gas detection and signal-to-noise ratio of uncooled IR imaging devices.

SUMMARY

Various embodiments of the methods and systems disclosed herein may be used to provide an infrared (IR) imaging system with high performance in capturing IR images of one or more types of gas in a scene.

An IR imaging device according to one embodiment of the disclosure has various system parameters (e.g., optical and/or non-optical components configurations) configured detect gas within a narrow wavelength band (a range of wavelengths) of interest. The uncooled IR imaging device (which for example may be cooled or uncooled) may be tuned such that the narrow wavelength band corresponds to a type of gas in interest to be detected within the scene.

An IR imaging system according to one or more embodiments of the disclosure may include an imaging sensor comprising an array of sensor pixels with two spectral responses in the array. A first set of sensor pixels having a first spectral response are configured to detect and image a gas of interest. A second set of sensor pixels having a second spectral response are configured to sense radiation outside of the gas detection bandwidth. In one embodiment, the second spectral band has a lower frequency that is above the first spectral band. Read-out integrated circuit and logic circuitry are configured to generate a first image of the scene sensed by the first sensor array and a second image of the scene sensed by the second sensor array. Gas detection logic is configured to detect the presence of gas in the first image, by computing the difference between the pixel values of the first image and the corresponding pixel values of the second image. In one embodiment, if the difference in pixel values exceeds a gas detection threshold then gas is determined to be present at the pixel location. The first image is modified using the gas presence determinations and difference values to enhance the visualization of the detected gas.

In one or more embodiments of the methods and systems disclosed herein, an uncooled infrared (IR) imaging system provides high performance capturing of IR images of one or more types of gas in a scene, and in some embodiments with a performance that is close to that of a cooled IR imaging device. In one aspect, an uncooled IR imaging device according to one or more embodiments of the disclosure has various system parameters (e.g., optical and/or non-optical components configurations) configured to allow a large percentage (e.g., greater than 90%) of IR radiation within a narrow wavelength band (a range of wavelengths) of interest from a scene to hit the imaging sensor of the IR imaging device, while substantially blocking IR radiation outside of the wavelength band from reaching the imaging sensor. The uncooled IR imaging device may be tuned in a way such that the wavelength band corresponds to a type of gas of interest. As a result, the uncooled IR imaging device may be configured to be highly sensitive to detecting a specific type of gas of interest within the scene.

In one aspect, for example, an uncooled IR camera system according to one or more embodiments of the disclosure may include: a lens assembly comprising a set of lens elements having at least one lens coating that allows at least 90% transmission of IR radiation within a particular range of wavelengths through the set of lens elements, a filter that blocks IR radiation outside of the particular range of wavelengths, and an imaging sensor comprising an array of sensor pixels having a pixel pitch greater than or equal to 15 micrometers. In some embodiments, the pixel pitch is greater than or equal to 15 micrometers. In some embodiments, the pixel pitch is greater than or equal to 20 micrometers, or between approximately 15 and 20 micrometers.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
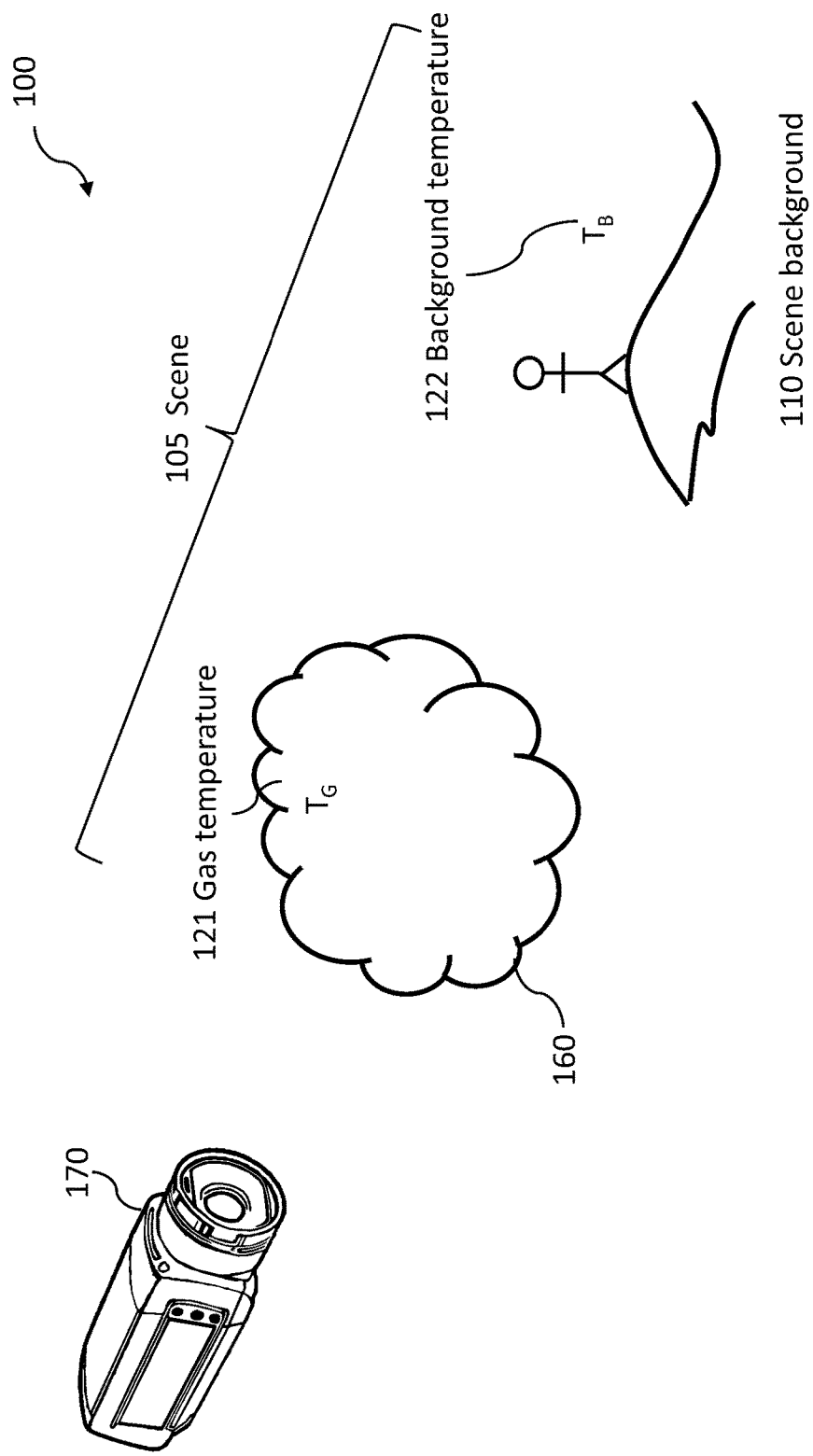
FIG. 1 illustrates an operating environment in which an infrared (IR) imaging device may operate in accordance with an embodiment of the disclosure.

Various embodiments of the methods and systems disclosed herein may be used to provide an uncooled infrared (IR) imaging system with high performance in capturing IR images of one or more types of gas in a scene. In one embodiment, an uncooled IR imaging device (e.g., an IR camera, a thermal camera, etc.) is configured to detect IR radiation within a narrow wavelength band (a range of wavelengths) of interest from a scene that hits the imaging sensor of the IR imaging device. The uncooled IR imaging device is also configured to detect IR radiation within a second wavelength band that is outside the gas detection range, and analyze the differences between the two IR images to detect the presence of a gas of interest.

In one embodiment, the uncooled IR imaging device may be tuned in a way such that the wavelength band corresponds to a type of gas of interest. As a result, the uncooled IR imaging device may be configured to be highly sensitive to detecting a specific type of gas of interest within the scene. For example, a microbolometer may include an optical cavity formed between an absorber and sensing substrate, which may be tuned to a selected gas absorption/emission band of interest by adjusting the height between the substrate and the absorber, thereby increasing the signal to noise ratio. In contrast, conventional microbolometers typically have a flat, not wavelength dependent, response curve. A tuned detector with an inherent narrow response curve matched to the gas (e.g., methane) detector spectral response maximum at 7.7 µm may be used in various embodiments. Furthermore, the imaging sensor may be configured to achieve high sensitivity, such as by providing pixels with a pixel pitch optimized for gas imaging.

In addition, the uncooled IR imaging device according to some embodiments may include a logic device (e.g., a processor and/or readout integrated circuitry) that is configured to process the captured IR images to improve the sensitivity, such as by pixel binning, frame averaging, and noise reduction operations. Using the noise equivalent concentration length (NECL) (NECL describes the amount of gas to which an IR imaging device will be responsive) as a metric to measure the sensitivity performance of an IR imaging device, a conventional uncooled IR imaging device may reach 1300 parts per million over meter (ppm×m) of NECL while a cooled IR imaging device may reach 13 ppm×m of NECL. Using the methods and systems of some embodiments described herein, an uncooled IR imaging device may reach a gas sensitivity of 100 ppm×m of NECL. It is noted that the various configurations of an uncooled IR imaging device in accordance to various embodiments described herein aim to improve the performance under the NECL metric.

Using IR imaging devices to capture a visual representation of a gas relies on the gas's characteristics of absorbing and/or emitting thermal energy. For example, a gas may emit thermal radiation in a particular wavelength band against a cold background, in which case the IR imaging device provides a visual representation of the gas by capturing a rise of the thermal radiation within the wavelength band around the area in the scene where the gas is present. A gas may absorb thermal radiation in a particular wavelength band against a warm background, in which case the IR imaging device provides a visual representation of the gas by capturing a reduction of thermal radiation in the particular wavelength band around the area in the scene where the gas is present. Thus, imaging of gas is based on the difference in gas temperature $T_G$ and background temperature $T_B$, as referred to as gas-to-background temperature difference $\Delta T$.

FIG. 1 illustrates an environment 100 in which an IR imaging device 170 according to one embodiment of the disclosure may operate. An IR imaging device 170 is adapted to capture radiation within controllable wavelength bands and thus to produce infrared images (also referred to as "IR images" or "thermal images"), representing a particular selected wavelength band of IR radiation from a scene 105. Scene 105 comprises a scene background 110 and gas 160 in the form of a gas plume in between scene background 110 and IR imaging device 170. Gas 160 is illustrated in the shape of a gas cloud. Scene background 110 has a background temperature $T_B$ 122, and gas 160 has a gas temperature $T_G$ 121. It is noted that a temperature difference $\Delta T$ 130 between background temperature $T_B$ 122 gas temperature $T_G$ 121 exists as a result of gas 160 absorbing or emitting thermal energy.

In accordance with one or more embodiments, IR imaging device 170 is configured to capture thermal radiation of scene 105 and generate an IR image representing thermal radiation from scene 105. The thermal radiation of scene 105 includes thermal radiation from scene background 110 (represented as $T_B$ 122) in combination with thermal radiation emitted and/or absorbed by gas 160 (represented as $T_G$ 121).

Specifically, IR imaging device 170 according to one or more embodiments of the disclosure generates an IR image of scene 105 by capturing thermal radiation from various parts of the scene that hit the imaging sensor of IR imaging device 170. Thermal radiation from different areas of the scene hits different areas on the imaging sensor. As such, some parts of the IR image representing the portion of scene 105 without any obscurity from gas 160 may include thermal radiation information based on the thermal radiation solely emitted from scene background 110. On the other hand, other parts of the IR image representing the portion of the scene 105 that is obscured by gas 160 may include thermal radiation information based on both the thermal radiation emitted from scene background 110 along with the characteristics of gas 160 to absorb and/or emit thermal radiation.

Figure 2:
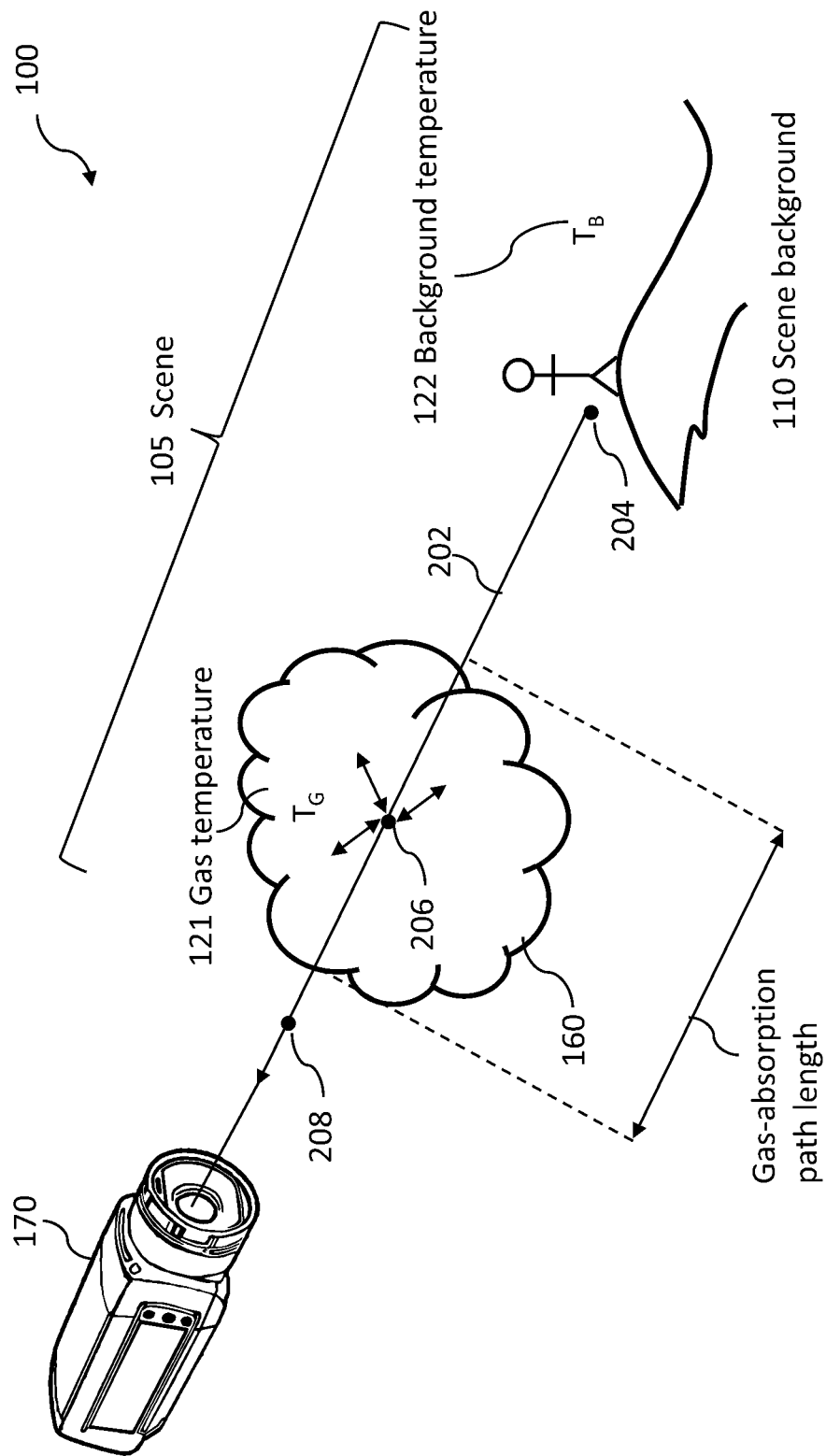
FIG. 2 illustrates an exemplary IR radiation path from the scene to the IR imaging device within the operating environment in accordance with an embodiment of the disclosure.

FIG. 2 illustrates, within scene 105, a thermal radiation path 202 from scene background 110 through gas 160 before hitting the imaging sensor of IR imaging device 170. As shown, thermal energy or IR radiation emitted from scene background 110 travels from an edge of scene background 110 at location 204, along the first section of the thermal radiation path 202 before hitting gas plume 160. Once the IR radiation enters into gas plume 160, e.g., at location 206, IR radiation undergoes a change. In the situation where gas 160 has the characteristics of absorbing IR radiation within a wavelength band, some of the IR radiation is being absorbed by gas 160, and as such, the radiance level of the IR radiation within the wavelength band gradually reduces while the IR radiation is traveling within gas plume 160, resulting in a reduced IR radiation as it exits gas plume 160 (e.g., at location 208) before hitting the imaging sensor of IR imaging device 170. As a result, only a fraction of the thermal energy or IR radiation emitted from scene background 110 reaches the imaging sensor of IR imaging device 170. It is noted that different types of gas may absorb thermal energy or IR radiation in different wavelength bands with different gas absorption or emission strengths. For example, methane ($CH_4$) has the characteristics of absorbing thermal energy or IR radiation in a wavelength band between 7.0 micrometers (μm) and 8.5 μm. Another type of gas might have the characteristics of absorbing thermal energy or IR radiation in a different wavelength band. In various embodiments, imaging of different types of gas is a function of based on the gas contrast (gas-to-background temperature difference $\Delta T$) which is a function of the difference between the background temperature $T_B$ and the gas temperature $T_G$, gas-path length and gas absorption/emission line strengths (e.g., wavelength, pressure and temperature dependent).

Figure 3A:
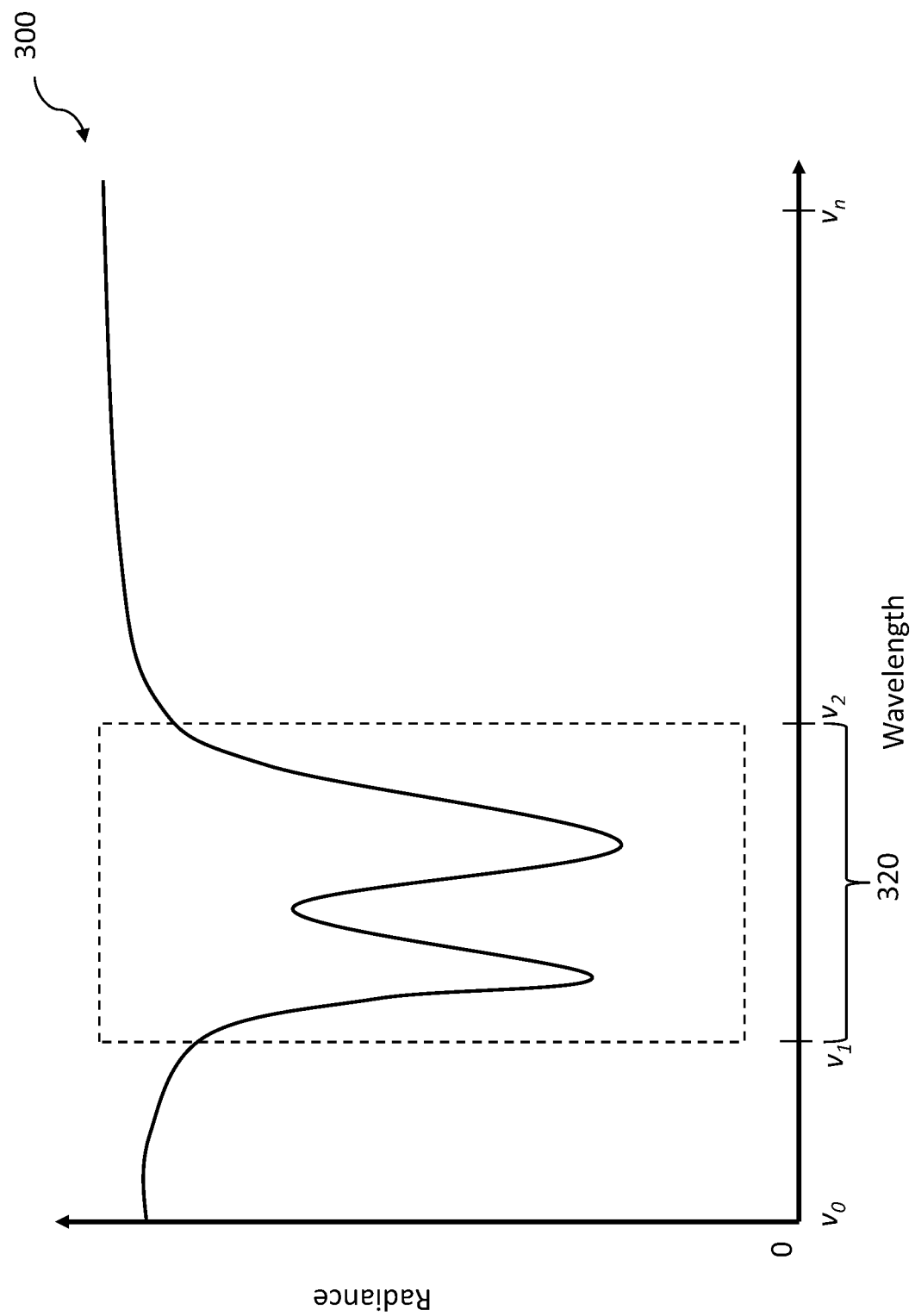
FIG. 3A illustrates radiance levels as a function of wavelength for detected IR radiation that goes through a gas plume that absorbs IR energy in accordance with an embodiment of the disclosure.

Graph 300 of FIG. 3A illustrates detected radiance levels of the thermal energy or IR radiation, which comes through thermal radiation path 202 in scene 105 when gas 160 has the characteristics of absorbing thermal energy, as a function of wavelengths. As shown, the radiance level is substantially even across the wavelengths except in the wavelength band between $v_1$ and $v_2$. The dip of the detected radiance level in the wavelength band between $v_1$ and $v_2$ is caused by the absorption of thermal energy or IR radiation by gas 160. As such, if gas 160 includes a substantial large amount of methane, $v_1$ and $v_2$ would substantially correspond to 7.0 μm and 8.5 μm, respectively.

On the other hand, in the situation where gas 160 has the characteristics of emitting IR radiation within a wavelength band, additional IR radiation is being added to the IR radiation from scene background 110 while the IR radiation is within gas plume 160. As such, the radiance level of the IR radiation within the wavelength band gradually increases while the IR radiation is traveling through gas plume 160, resulting in an increased IR radiation as it exits gas plume 160 (e.g., at location 208) before hitting the imaging sensor of IR imaging device 170. As a result, the combined thermal energy or IR radiation emitted from scene background 110 and gas 160 reaches the imaging sensor of IR imaging device 170. It is noted that different types of gas may emit thermal energy or IR radiation in different wavelength bands.

Figure 3B:
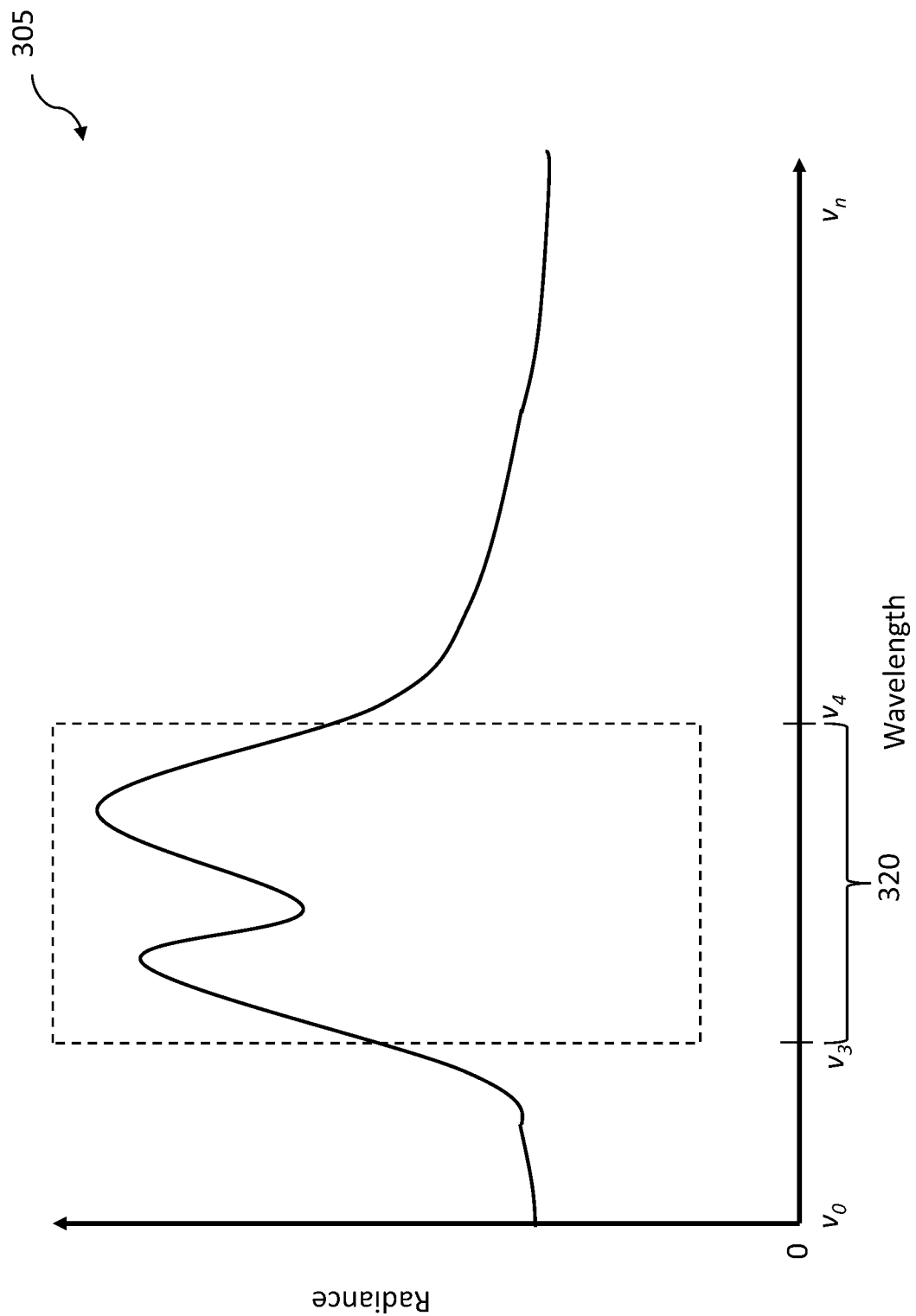
FIG. 3B illustrates radiance levels as a function of wavelength for detected IR radiation that goes through a gas plume that emits IR energy in accordance with an embodiment of the disclosure.

Graph 305 of FIG. 3B illustrates detected radiance levels of the thermal energy or IR radiation, which comes through thermal radiation path 202 in scene 105 when gas 160 has the characteristics of emitting thermal energy, as a function of wavelengths. As shown, the radiance level is substantially even across the wavelengths except in the wavelength band between $v_3$ and $v_4$. The spike of the detected radiance level in the wavelength band between $v_3$ and $v_4$ is caused by the thermal energy or IR radiation emitted by gas 160.

Instead of capturing thermal energy or IR radiation across the entire IR spectrum, it has been contemplated that the sensitivity of an IR imaging device may be improved by capturing thermal energy or IR radiation within a narrower IR wavelength band. As such, an uncooled IR imaging device according to one embodiment of the disclosure includes various system parameters (e.g., optical and/or non-optical components) configured to allow a large percentage (e.g., greater than 90%) of infrared (IR) radiation within a narrow wavelength band from a scene to reach the imaging sensor of the IR imaging device, while substantially blocking IR radiation outside of the wavelength band from reaching the imaging sensor.

Figure 4:
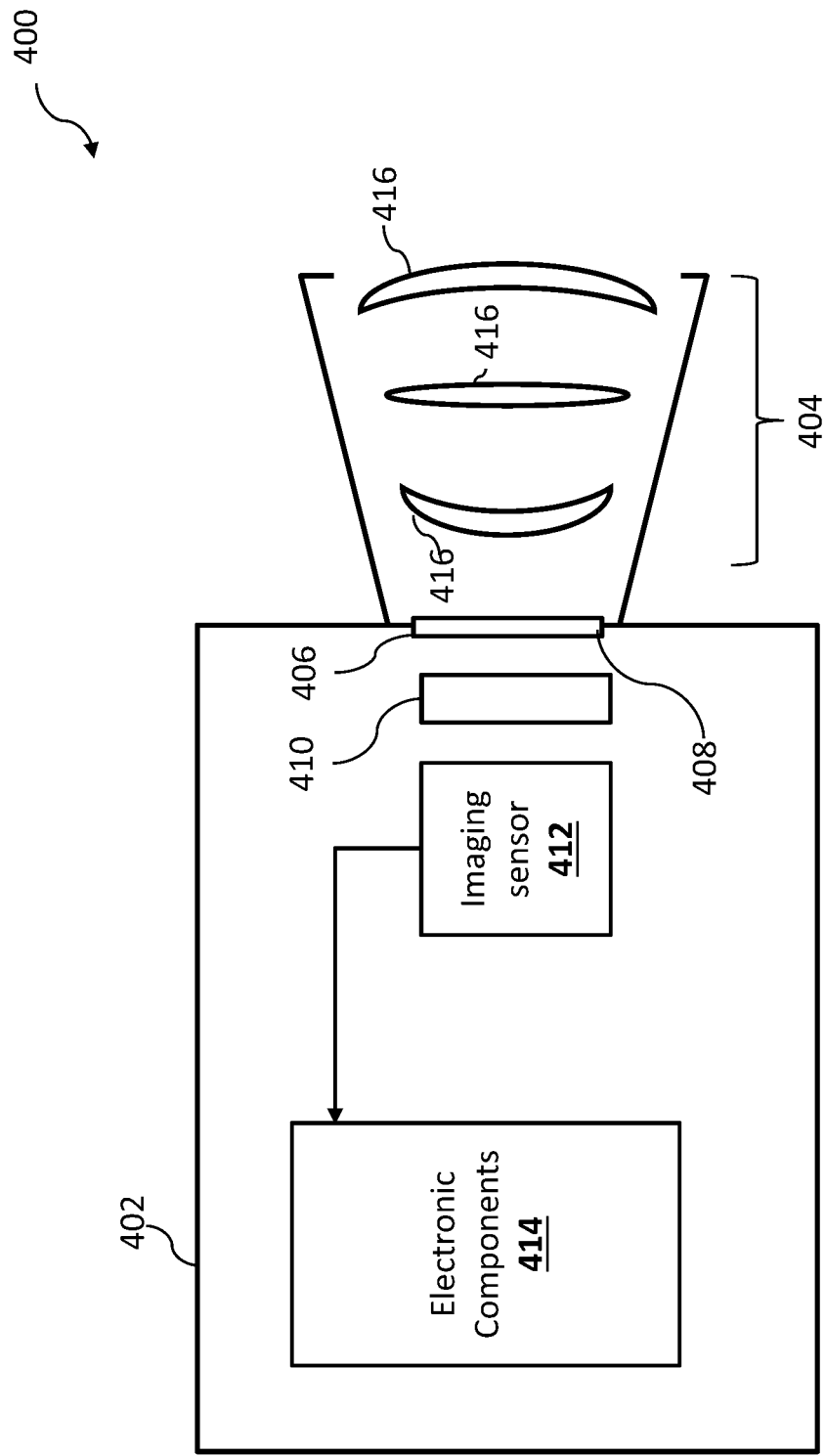
FIG. 4 is a schematic of an IR imaging device in accordance with an embodiment of the disclosure.

FIG. 4 is a schematic of an example of an IR imaging device 400. In some embodiments, IR imaging device 400 is a camera, and more specifically, an IR camera. Additionally, the IR imaging device 400 according to one embodiment of the disclosure is configured to be optimized for capturing IR radiation within a narrow wavelength band corresponding to a type of gas. Preferably, the narrow wavelength band has a range of less than or equal to 2 μm. Even more preferably, the narrow wavelength band has a range of less than or equal to 1.5 μm. Depending on the type of gas that is of interest, IR imaging device 400 can be configured to capture an IR image within a specific narrow wavelength band that corresponds to the gas in interest. For example, for capturing IR image of methane gas, IR imaging device 400 according to one or more embodiment of the disclosure can be configured (with various specific system parameters) to capture IR radiation in the narrow wavelength band within a range between 7.0 μm and 8.5 μm.

In some embodiments, IR imaging device 400 has an enclosure 402 enclosing the various components of IR imaging device 400. As shown, IR imaging device 400 has a lens assembly 404, an inlet 406, a window 408, a filtering component 410, an imaging sensor 412, and other electronic components 414. Lens assembly 404 includes one or more lens elements 416, which together, are configured to optically focus a scene (e.g., scene 105) from the perspective of the location of imaging sensor 412. As such, the one or more lens elements 416 include refractive properties that redirect IR radiation from the scene (e.g., scene 105) to imaging sensor 412. In some embodiments, lens assembly 404 is fixed onto IR imaging device 170, while in other embodiments, lens assembly 404 is removable from IR imaging device 170 such that different lens assemblies may be attached to IR imaging device 170 for different purposes. For example, different lens assemblies with different focal lengths and/or zoom capabilities may be interchangeable for IR imaging device 170. In this example, lens assembly 404 has a specific focal length that defines a particular field of view (FOV) for IR imaging device 400.

A coating, such as an anti-reflective coating, may be applied to each of the lens elements 416. The coating may have the property of reducing reflection of IR radiation from the lens element (that is, improving transmission efficiency of IR radiation through the lens element). Different coatings may have different anti-reflection characteristics. According to one or more embodiments of the disclosure, a coating that is optimized for reducing reflection for IR radiation within the wavelength band(s) of interest is selected to be applied on the lens elements 416.

In some embodiments, the coating can be applied to one or both sides of each lens element 416. A coating that allows more than 90% of IR radiation within the narrow wavelength band to transmit through the lens element 416 may be selected. In some embodiments, a coating that allows more than 95% (or even 98%) of IR radiation within the narrow wavelength band to transmit through the lens element 416 is selected.

It is noted that no matter how efficient the lens elements (even with the coating as described above) are in transmitting IR radiation, each lens element reduces transmission of IR radiation to a certain extent. As such, it has been contemplated in various embodiments that lens assembly 404 will include a minimum number of optical elements to meet performance and costs parameters. In some embodiments, lens assembly 404 includes five lens elements or less. It has been contemplated that lens assembly 404 may include two lens elements or less to further improve the transmission of IR radiation.

IR imaging device 400 also includes a radiation inlet 406 disposed at a connection point with lens assembly 404. Radiation inlet 406 is an opening (a hole) through which IR radiation that is redirected by lens assembly 404 can enter into the interior of enclosure 402 and ultimately to imaging sensor 412. Preferably, radiation inlet 406 has an associated aperture (a size), and is, in some embodiments, substantially circular (e.g., 90%) in shape. The aperture of inlet 406 determines the amount of IR radiation that enters into enclosure 402 and reaches imaging sensor 412. In order to maximize the amount of IR radiation from scene 105 to reach imaging sensor 412, a large aperture is selected for inlet 406. In some embodiments, the aperture has an f number (ratio of the focal length specified for lens assembly 404 to the diameter of the inlet 406) less-than or equal to f/2. Even more preferably, the aperture has an f number less-than or equal to f/1.5, and even more preferably, less-than or equal to f/1.0. In some embodiments, the aperture selected for inlet 406 is less-than or equal to f/0.6. In some embodiments, the ratio between the focal length and the aperture diameter is selected to be as small as reasonably practical for gas detection with an uncooled detector.

According to some embodiments of the disclosure, a window 408 is disposed at inlet 406. In some embodiments, window 408 covers the entire opening of inlet 406 such that IR radiation that is redirected by lens assembly 404 passes through window 408 before reach other elements, such as imaging sensor 412, of IR imaging device 400 within enclosure 402. Window 408 can advantageously prevent external particles (e.g., dust) from entering into enclosure 402 that could potentially damage the electronic components of IR imaging device 400 and/or cause interference to capturing images of scene 105. Window 408 may be made of a material that has a high efficiency of transmitting IR radiation within the particular narrow wavelength band. According to one embodiment of the disclosure, window 408 is made of Germanium.

In some embodiments, a coating, such as the type of coating described above by reference to the description of the lens elements, may be applied to one or both sides of window 408 to further improve the efficiency of transmitting IR radiation. According to one or more embodiments of the disclosure, the coating is optimized for reducing reflection for IR radiation within the particular wavelength band(s) of interest. It has been contemplated that passing only relevant IR radiation (e.g., the IR radiation within the particular narrow wavelength band) to imaging sensor 412 and eliminating other IR radiation from reaching imaging sensor 412 may further improve the quality of the image produced by IR imaging device 400 by increasing the signal-to-noise ratio of the image. As such, IR imaging device 400 according to some embodiments the IR imaging device 400 may also include a filtering component disposed between inlet 406 and imaging sensor 412, configured to allow only IR radiation within the particular narrow wavelength band to pass through while blocking IR radiation outside of the particular narrow wavelength band. Filtering component 410 may include one or more filters. In one example, filtering component 410 may include a cut-on filter configured to cut on at the shortest wavelength within the particular narrow wavelength band and a cut-off filter configured to cut off at the longest wavelength within the particular narrow wavelength band. The cut-on/cut-off filters may be made with materials and configuration that blocks off (or reflect) any light waves with wavelengths that are either below (in the case of a cut-on filter) or above (in the case of a cut-off filter) a certain wavelength. In various embodiments, the filtering component 410 is configured to select a desired spectral band by selecting one or more filters based on filtering criteria including cut-on, cut-off, positions, transmittance and tolerance of the selected filters. The selection of filters to select the spectral bands as described herein enhances the signal-to-noise ratio and reduces unwanted (false alarms) wavelength dependent effects, e.g., reflectance variations over the spectral bands. In some embodiments, filtering component 410 and window 408 are not separate elements, but instead they may be combined into one or more optical element that is configured to cover inlet 406 and optically filter the incoming IR radiation.

Imaging sensor 412, in some embodiments, may include an IR imaging sensor which may be implemented, for example, with a focal plane array (FPA) of bolometers, micro-bolometers, thermocouples, thermopiles, pyroelectric detectors, or other IR sensor elements responsive to IR radiation in various wavelengths such as for example, in the range between 1 micrometer and 14 micrometers. In one example, imaging sensor 412 may be configured to capture images of a very narrow range of wavelengths. For example, imaging sensor 412 may be configured to capture images of the particular narrow wavelength band between 7.0 µm and 8.5 µM.

According to some embodiments of the disclosure, imaging sensor 412 has pixels having pixel pitch of at least 20 µm. In other embodiments, imaging sensor 412 has pixels having pixel pitch of at least 25 µm. Having a larger pixel pitch allows each pixel to occupy a larger surface area of imaging sensor 412, thereby increasing the area for detecting IR radiation.

Furthermore, similar to lens elements 416 and inlet 406, a coating may be applied to each individual pixel (detector) in imaging sensor 412. According to one or more embodiments of the disclosure, a coating that is optimized for reducing reflection for IR radiation within the narrow wavelength band(s) of interest is selected to be applied on the lens elements 416. In some embodiments, the coating applied to the pixels is the same coating applied to lens elements 416 and inlet 406.

Figure 5:
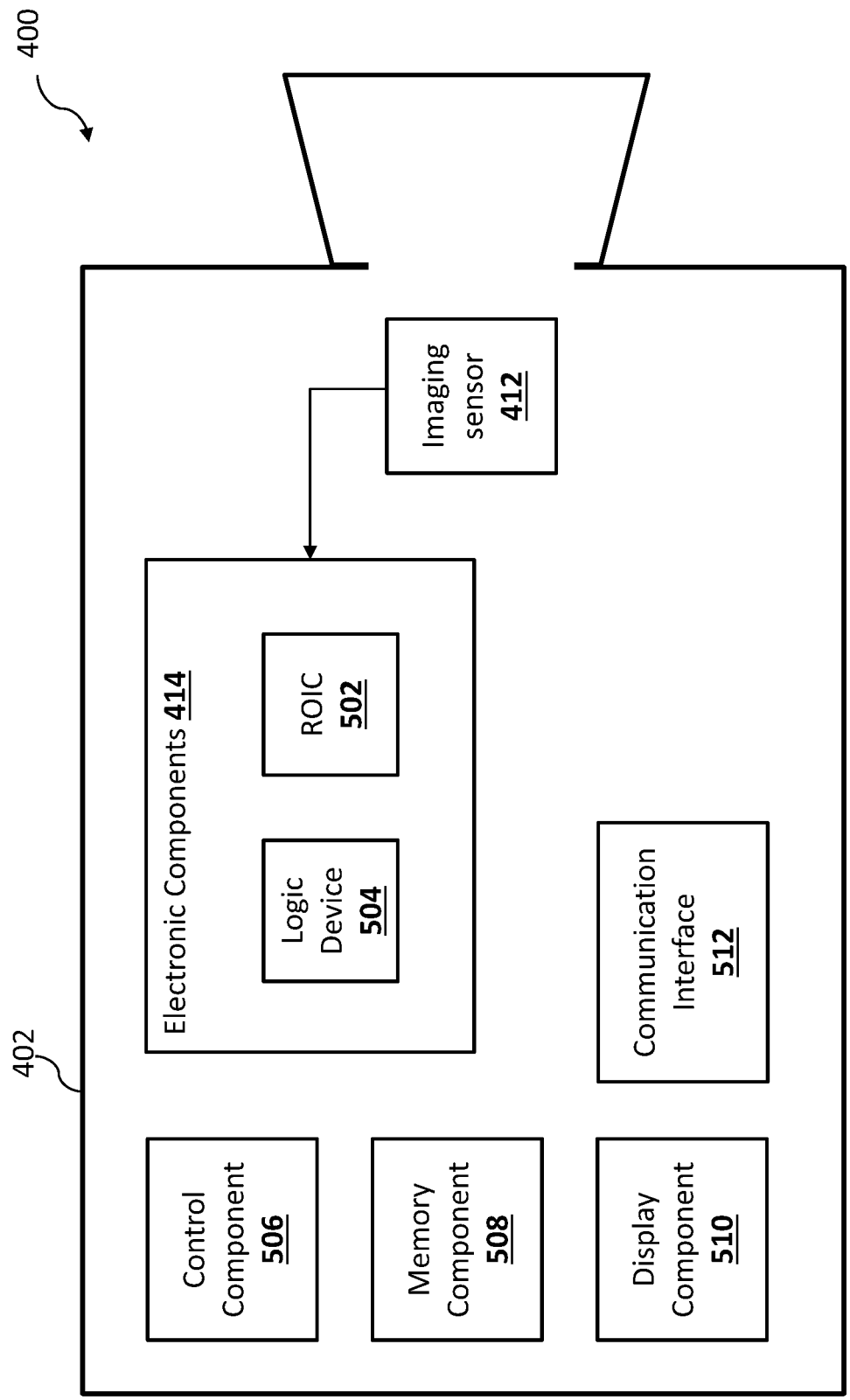
FIG. 5 is a block diagram of an IR imaging device in accordance with an embodiment of the disclosure.

As shown, imaging sensor 412 is communicatively coupled with electronic components 414 disposed within enclosure 402 of IR imaging device 400. FIG. 5 illustrates the various electronic components of IR imaging device 400 in more detail. As shown, imaging sensor 412 is communicatively coupled with logic device 504 via readout integrated circuit 502. Readout integrated circuit 502 can be implemented by any type of integrated circuitry, and is configured to read (or accumulate) a signal (e.g., a current or voltage) indicative of the intensity of the received IR radiation at each pixel (detector) of imaging sensor 412 and then transfer the resultant signal onto output taps for readout. In some embodiments, readout integrated circuit 502 is also configured to convert the analog current signals into digital data. In other embodiments, logic device 504 is configured to read the analog output from readout integrated circuit 502 and convert the analog output to digital data. In some embodiments, the digital data includes pixel data corresponding to the pixels within an image frame or video image frame. The pixels in the image frame may or may not correspond to the pixels (detectors) on imaging sensor 412.

In one example, readout integrated circuit 502 is configured to provide a pixel value for each detector on imaging sensor 412. However, it has been contemplated that readout integrated circuit 502 may be configured to perform a pixel binning processing to further improve the signal-to-noise ratio of the IR image. For example, readout integrated circuit 502 may be configured to group adjacent detectors (e.g., a 2 by 2 detector block), take a sum or an average of the signals from those detectors, and use that value for a single pixel on the image frame. In some other embodiments, the pixel binning may be performed by logic device 504 instead of readout integrated circuit 502.

Logic device 504 may be implemented as any appropriate circuitry or device (e.g., a processor, microcontroller, application specific integrated circuit (ASIC), field-programmable gate array (FPGA), or other programmable or configurable logic devices) that is configured (e.g., by hardware configuration, software instructions, or a combination of both) to perform various operations for IR imaging device 400 as described herein. For example, logic device 504 may be configured to perform pixel binning on image signals received from imaging sensor 412 via readout integrated circuit 502 as described above. Logic device 504 may be communicatively coupled to (e.g., configured to communicate with) imaging sensor 412 (via readout integrated circuit 502), control component 506, memory component 508, display component 510, and communication interface device 512.

According to some embodiments of the disclosure, readout integrated circuit 502, logic device 504, or both may be configured to control the amount of time the signals from pixels (detector) of imaging sensor 412 are integrated (e.g., collected) to provide corresponding pixel values (e.g., analog values or digital values) for each image frame or video image frame. For example, in microbolometer array implementations of imaging sensor 412 according to some embodiments, readout integrated circuit 502 may comprise an integrating amplifier to integrate the signals from the pixels into a desired range of amplified pixel signals representing corresponding pixel values. In this regard, readout integrated circuit 502 and/or logic device 504 according to some embodiments of the disclosure may be configured to control the duration of such signal integration (also referred to as "integration time") to provide a signal-to-noise ratio of the captured IR image that is optimized for gas imaging.

It has been contemplated to in order to further improve signal-to-noise ratio of the IR image, readout integrate circuit 502 may be configured to provide a long integration time for capturing each image frame or each video image frame. According to some embodiments of the disclosure, logic device 504 may be configured to provide an integration time of at least 1/20 seconds (i.e., capturing video image frames at a speed of 20 Hz), or at least 1/15 seconds (i.e., capturing video image frames at a speed of 15 Hz). In some embodiments, readout integrated circuit 502 may be configured to provide a shutter speed of at least 1/10 seconds (i.e., capturing video image frames at a speed of 10 Hz). Depending on embodiments, the integration time may be controlled alternatively or additionally by logic device 504.

Additionally, it has been contemplated that limiting the range sensitivity of the detectors of imaging sensor 412 to a narrow dynamic range may improve the quality of signals obtained at the detectors. Accordingly, readout integrated circuit 502 and/or logic device 504 of some embodiments may be configured to provide a narrow dynamic range for the IR radiation intensity detectable by the imaging sensor 412, such as a dynamic range of 100 degrees Celsius, a dynamic range of 80 degrees Celsius, or even a dynamic range of 50 degrees Celsius. For example, integrating amplifiers, bias circuits, and/or other circuits of readout integrated circuit 502 may be configured such that the range of output pixel values (e.g., in analog or digital signals) in the IR image data provided by readout integrated circuit 502 corresponds to a desired narrow dynamic range (e.g., a range spanning from 0 to 50 degrees Celsius, inclusive). Additionally or alternatively, logic device 504 may be configured to convert the range of output pixel values in the image data to correspond to a desired narrow dynamic range (e.g., a range spanning from 0 to 50 degrees Celsius, inclusive).

After receiving image data representing image frames (or video image frames) from imaging sensor 412 via readout integrated circuit 502, logic device 504 may perform additional image processing to the image frames according to some embodiments of the disclosure, which may further improve the signal-to-noise ratio of the image frames. For example, logic device 504 may be configured to perform frame averaging over multiple image frames (e.g., 2, frames, 3 frames, 4 frames, etc.). Logic device 504 may perform frame averaging by generating a new image frame that takes the average value for each pixel across the multiple frames. Instead of or in addition to frame averaging, logic device 504 may also be configured to perform one or more noise reduction algorithms (such as linear smoothing filters, an anisotropic diffusion, wavelet transform, non-linear filters, temporal filtering, spatial filtering/smoothing, etc.) on the image frames.

As shown in FIG. 5, IR imaging device 400 may also include other components such as control component 506, memory component 508, display component 510, communication interface device 512, and/or others. Control component 506 comprises, in one embodiment, a user input and/or interface device, such as a rotatable knob (e.g., potentiometer), push buttons, slide bar, keyboard, touch sensitive display devices, and/or other devices, that is adapted to generate a user input control signal. Logic device 504 may be configured to sense control input signals from a user via control component 506 and respond to any sensed control input signals received therefrom. Logic device 504 may be configured to interpret such a control input signal as a value, as generally understood by one skilled in the art. In one embodiment, control component 506 may comprise a control unit (e.g., a wired or wireless handheld control unit) having push buttons adapted to interface with a user and receive user input control values. In one implementation, the push buttons of the control unit may be used to control various functions of IR imaging device 400, such as instructing IR imaging device 400 to being capturing images of a scene, displaying IR images that has been captured by IR imaging device 400, and/or various other features of an imaging system or camera.

Memory component 508 comprises, in one embodiment, one or more memory devices configured to store data and information, including video image data and information. Memory component 508 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, logic device 504 may be configured to execute software instructions stored in memory component 508 so as to perform method and process steps and/or operations described herein. Logic device 504 may be configured to store in memory component 508 video image frames or digital image data captured by the imaging sensor 412.

Display component 510 comprises, in one embodiment, an image display device (e.g., a liquid crystal display (LCD)) or various other types of generally known video displays or monitors. Logic device 504 may be configured to display image data and information (e.g., video analytics information) on display component 510. Logic device 504 may be configured to retrieve image data and information from memory component 508 and display any retrieved image data and information on display component 510. Display component 510 may comprise display circuitry, which may be utilized by the logic device 504 to display image data and information. Display component 510 may be adapted to receive image data and information directly from the imaging sensor 412 or logic device 504, or the image data and information may be transferred from memory component 508 via logic device 504.

Communication interface device 512 may include a network interface component (NIC) or a hardware module adapted for wired and/or wireless communication with a network and with other devices connected to the network. Through communication interface device 512, logic device 504 may transmit video image frames generated at IR imaging device 400 to external devices, for example for viewing at a remote monitoring, and may receive commands, configurations, or other user input from external devices at a remote station. In various embodiments, communication interface device 512 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components, such as wireless transceivers, adapted for communication with a wired and/or wireless network. As such, communication interface device 512 may include an antenna coupled thereto for wireless communication purposes. In other embodiments, communication interface device 512 may be adapted to interface with a wired network via a wired communication component, such as a DSL (e.g., Digital Subscriber Line) modem, a PSTN (Public Switched Telephone Network) modem, an Ethernet device, a cable modem, a power-line modem, etc. for interfacing with DSL, Ethernet, cable, optical-fiber, power-line and/or various other types wired networks and for communication with other devices on the wired network.

In various embodiments, imaging sensor 412 is an uncooled microbolometer imaging sensor. Gas detection using uncooled microbolometers continues to pose challenges with respect sensitivity for gas detection. For example, a conventional uncooled microbolometer may have the sensitivity to detect gas at the low end of a long wave IR (LWIR) band, e.g., at around 7 μm (actual detection range TBR), but may be unable to detect gas at higher wavelengths, such as at around 8 um. Referring to FIGS. 6-12, various embodiments of imaging sensor 412, ROIC 502 and logic device 504 for increasing gas sensitivity in an uncooled microbolometer imaging sensor are described.

In various embodiments, the imaging sensor 412 includes two or more microbolometers having different spectral responses in the same imaging array, which includes a plurality of pixel sensors arranged in rows and columns. The array of pixel sensors includes a first subset of pixel sensors having a narrow spectral bandwidth, with sensitivity down to a lower gas detection range (e.g., 7 um), and a second subset of pixel sensors having a wide spectral bandwidth, with sensitivity down to a lower range (e.g., 8 um) that is outside the gas detection range (e.g., a lower range at which the pixel sensors are unable to sense the gas as determined by system parameters and configuration).

In various embodiments, the first and second subsets of pixel sensors are arranged in close proximity to each other on the image sensor 412 in the same array. The ROIC 502 and logic device 504 are configured to extract pixel values for each of the first and second subset of pixels, respectively. In one embodiment, a first image of the scene is constructed from the first subset of pixels, and a second image of the scene is constructed from the second subset of pixels. The pixel values of the first image correspond to the presence or absence of gas as detected by the first subset of image sensors.

In one embodiment, corresponding pixel values of the first image and the second image are compared and the comparison results are used to enhance the visualization of the gas presence in the first image, allowing for higher sensitivity gas detection. For example, pixels of the second image may be subtracted from corresponding pixels of the first image, with the magnitude of the resulting values providing an indication of the presence or absence of gas at each pixel. In one embodiment, the resulting comparison image (or difference image) may be used to enhance the first image, producing a higher sensitivity visualization of the detected gas.

In various embodiments, the ROIC 502 and imaging sensor 412 are arranged as an imaging array having two or more different bolometers having different spectral responses within the long wave IR (LWIR) band. Conventional bolometers may have a standard response through the LWIR band and are not sensitive to gas in the scene. By using 2 or more bolometers having different spectral responses, a wide spectral response bolometer may be used as disclosed herein with increased sensitivity to lower wavelengths in the LWIR band, allowing for response to gas in the scene with greater sensitivity. By placing two different bolometers of different spectral responses close together on the array, an image can be formed with standard bolometers while gas detection can be done at the same time by comparing the output of the wide spectral response bolometers to the neighboring standard response bolometers and looking for large differences.

Figure 6:
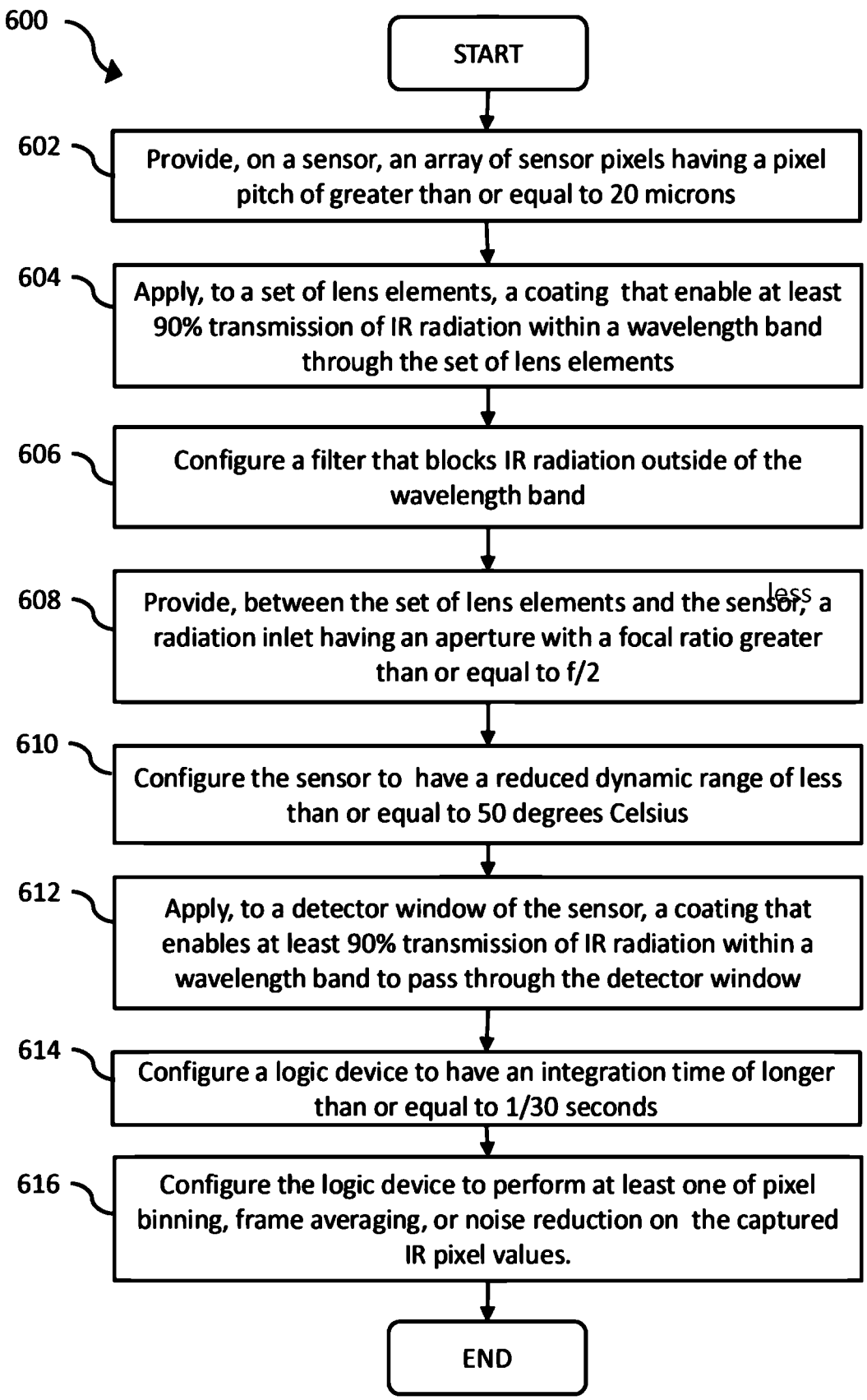
FIG. 6 is a flow chart for configuring an uncooled IR imaging device in accordance with an embodiment of the disclosure.

FIG. 6 illustrates a process 600 for configuring an uncooled infrared camera to perform optical gas imaging. The uncooled infrared camera of some embodiments includes a set of lens elements, an imaging sensor, and a logic device. It is noted that in some embodiments, a subset or all of the steps included in process 600 may be performed in order to improve the optical gas imaging performance of the uncooled infrared camera with respect to the NECL metric. At step 602, an array of sensor pixels is provided on the imaging sensor. It has been contemplated that a large pixel pitch in an IR sensor may improve the resulting IR images with respect to the NECL metric. Even though larger pixel pitches may result in a lower resolution, it is generally acceptable as gas images have no high spatial frequency. The array of sensor pixels has a pixel pitch of greater than or equal to 15 micrometers, and in some embodiments, greater than or equal to 20 micrometers. In some embodiments, the array of sensor pixels may have a pixel pitch between 20 micrometers and 100 micrometers, inclusively. In some embodiments, a coating that increases sensitivity in the spectral region of interest (e.g., 7.0 μm-8.5 μm) may be applied to each micro-bolometer at the pixel level. In some embodiments, a desired pixel pitch (e.g., pixel pitch greater than or equal to 15 micrometers) can be achieved by binning two or more pixels that are of smaller pitch, as would be understood by one skilled in the art.

In various embodiments, a large pixel area may be an advantage when the microbolometer is used in a narrow band camera. Further advantages are achieved by tuning the optical cavity tuned to the gas band. In this manner, the gas detector may be designed to be as much signal photon noise limited as possible and while limiting the other noise components in the microbolometer and IC. Binning several pixels also increases signal-to-noise ratio.

At step 604, at least one coating is applied to the set of lens elements. The at least one coating may be applied to one or both surfaces of each lens element in the set of lens elements. As mentioned above, the coating has the characteristics of allowing at least 90% transmission of IR radiation within a wavelength band (e.g., between 7.0 μm and 8.5 μm) through the set of lens elements. The optimized coating and responses for the narrow spectral range (the narrow wavelength band) further improve the resulting IR images with respect to the NECL metric).

At step 606, a filter is inserted into the uncooled infrared camera and disposed between the set of lens elements and the imaging sensor. In some embodiments, the filter is configured to block IR radiation outside of the wavelength band. The narrow band pass filter further improves the resulting IR images with respect to the NECL metric (reducing the NECL score) as it allows high average transmission of IR radiation within the narrower band. At step 608, a radiation inlet is provided between the set of lens elements and the imaging sensor for allowing IR radiation that passes through the set of lens elements to reach the imaging sensor. In some embodiments, the radiation inlet has an aperture with a focal ratio less than or equal to f/2 with respect to the focal length of the set of elements. In some embodiments, the aperture is substantially around f/1.

At step 610, the imaging sensor is configured to have a reduced dynamic range of less than or equal to 50 degrees Celsius. In some embodiments, the reduced dynamic range is equal to or less than 50 degrees Celsius. The reduced (narrowed) dynamic range provides that the digitalization noise do not disturb the gas detection. Conventional uncooled IR imaging systems usually have a dynamic range of 200 degrees Celsius. To avoid digitalization noise, the dynamic range is preferably less than half of the dynamic range of the conventional uncooled IR imaging systems. At step 612, the at least one coating is applied to a detector window of the imaging sensor and to the sensor pixels to allow at least 90% transmission of IR radiation within the wavelength band through the detector window of the imaging sensor. The optimized coatings and responses for the narrow spectral range (the narrow wavelength band) further improve the resulting IR images with respect to the NECL metric.

At step 614, the logic device is configured to capture IR image data with an integration time of longer than or equal to 1/30 seconds. In some embodiments, the integration time can be any integration time between 1/30 seconds and 1 second. Even more preferably, the logic device may be configured to capture image data with an integration time substantially equal to 1/15 seconds. The optimized integration time (and frame rate) further minimizes noise in the resulting IR images. However, it has been contemplated that the integration time cannot be too long, as it may produce pink (1/f) noise, which cannot be easily filtered out.

At step 616, the logic device is configured to perform image processing to improve the signal-to-noise ratio of the captured images. The image processing may include pixel binning, frame averaging, and noise reduction, as discussed above.

Figure 7B:
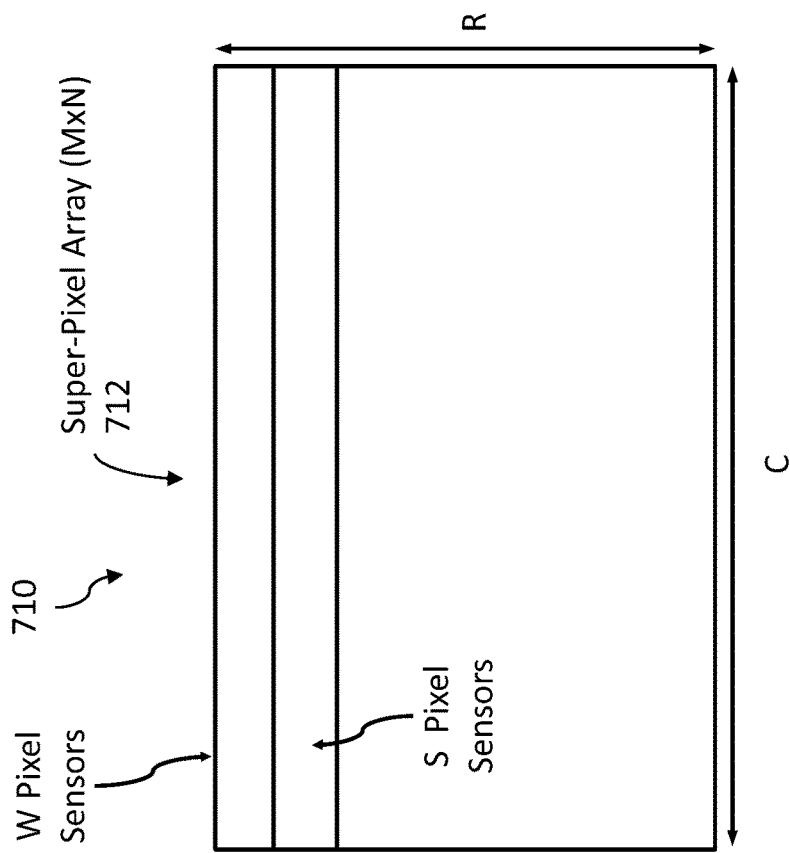
FIGS. 7A and 7B are block diagrams illustrating exemplary super-pixel array structures in accordance with embodiments of the disclosure.
Figure 7A:
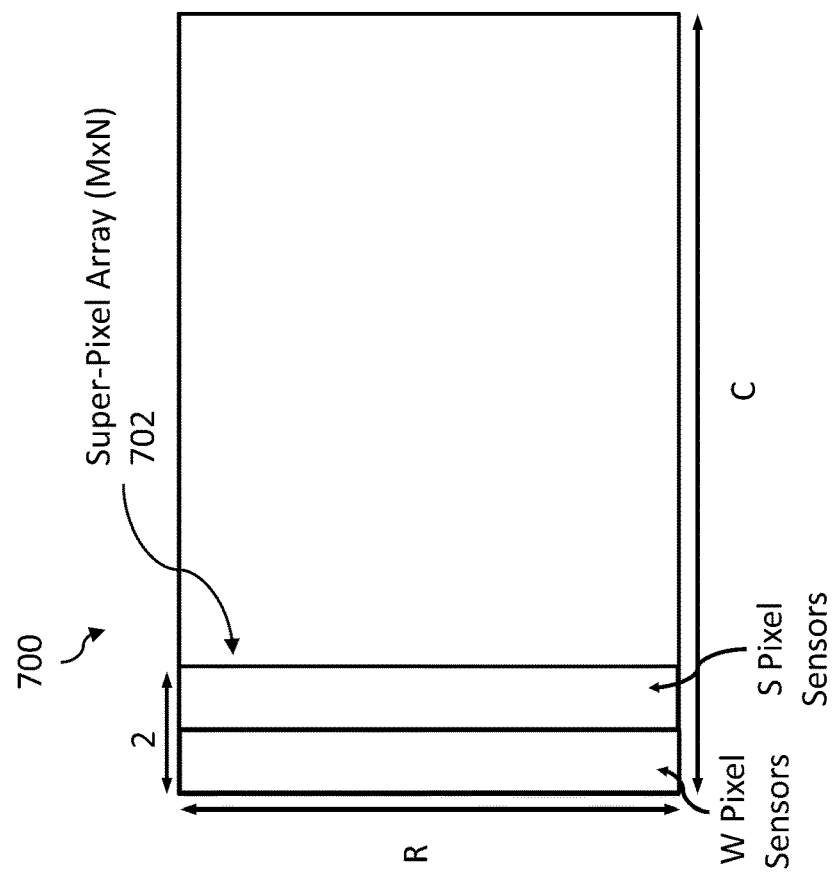

Referring to FIGS. 7A and 7B, embodiments of arrangements of wide spectral response pixel sensors ("W pixels" or "W sensors") and standard response pixel sensors ("S pixels" or "S sensors") will be discussed. The image pixel sensors are arranged in an image array 700 having the size of C columns by R rows. The image array 700 of FIG. 7A comprises a plurality of super-pixel arrays 702 of size M×N. For example, a 320×256 image array could comprise a plurality of 16×16 super-pixel arrays that are replicated 20 times across the columns and 16 times across the rows. Within this M×N super-pixel various arrangements of wide spectral response pixels "W" and standard response pixel "S" can be obtained. For example, to make every other column have different spectral response bolometers, the super-pixel array, M×N, could be defined with M=2 columns of pixel sensors and N equal to the number of rows, R, as illustrated in FIG. 7A. In one embodiment, each super-pixel includes one 1×R column of wide spectral response pixels and one 1×R column of standard response pixels. Similarly, as illustrated in FIG. 7B, for varying the spectral response at each row, a super-pixel 712 could be defined for an array 710 having a size of C columns by 2 rows.

In various embodiments, it is assumed that the wide response bolometers are used for detecting gas and the standard response bolometers are responsible for showing the image. In such embodiments, it is desirable to maximize the number of standard response bolometers used for imaging and minimize the number of wide spectral response bolometers used to detect gas within the scene. The optimum number of wide vs. standard pixels will vary based on the expected scene, pixel size, optics, and other system configurations and arrangements.

Figure 7C:
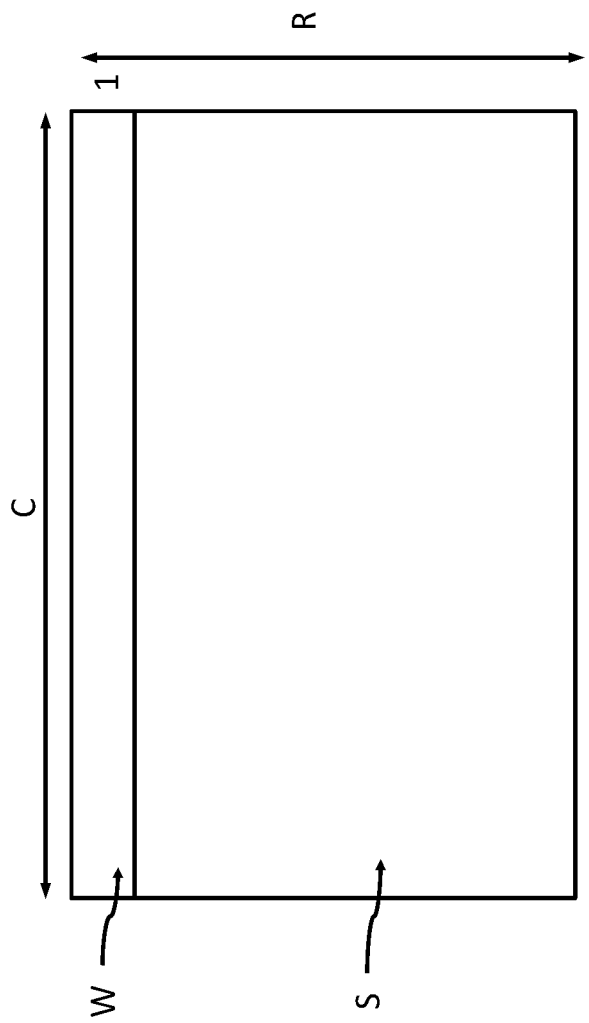
FIG. 7C is a block diagram illustrating an exemplary super-pixel array structures in accordance with an embodiment of the disclosure.

To increase the number of standard pixels, a super pixel of C×M could be composed of C×1 wide spectral response bolometers (W) and C×(M−1) standard bolometers (S), as depicted in FIG. 7C. Similarly, a super pixel of N×R could be composed of 1×R wide spectral response bolometers (W) and (N−1)×R standard bolometers (S).

Figure 8:
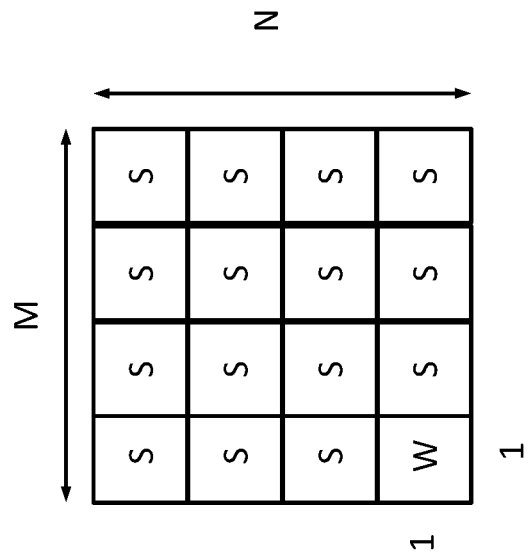
FIG. 8 is a block diagram illustrating an exemplary super-pixel array structure in accordance with an embodiment of the disclosure.

In various embodiments, to maximize the number of standard pixels within the image array, an M×N super pixel may be composed of only 1 wide spectral response bolometer with the remaining pixels being standard bolometers as depicted in FIG. 8. For example, if the super-pixel were 2×2, then 1 pixel would be of wide spectral response and the remaining 3 pixels would be standard response bolometers. Other arrangements are also contemplated, hereunder, such as a checkerboard-like pattern can be used that alternates between wide and standard spectral response bolometers.

In one embodiment, the ROIC 502 is configured to correctly bias each of the two different bolometers so that they produce a uniform scene with minimal output change over the ambient temperature, allowing for maximum dynamic range over a larger ambient temperature range. Depending on how the temperature compensation is achieved on the ROIC 502, different configurations within the super-cell may be desired. For example, if the temperature compensation by ROIC 502 is performed on a row basis, then a super pixel of C×M, composed of C×1 wide spectral response bolometers and C×(M−1) standard bolometers may be used. In this way the 1 row of wide spectral response bolometers could all be temperature compensated together and the M−1 standard bolometer rows could each have the standard temperature compensation.

Figure 9A:
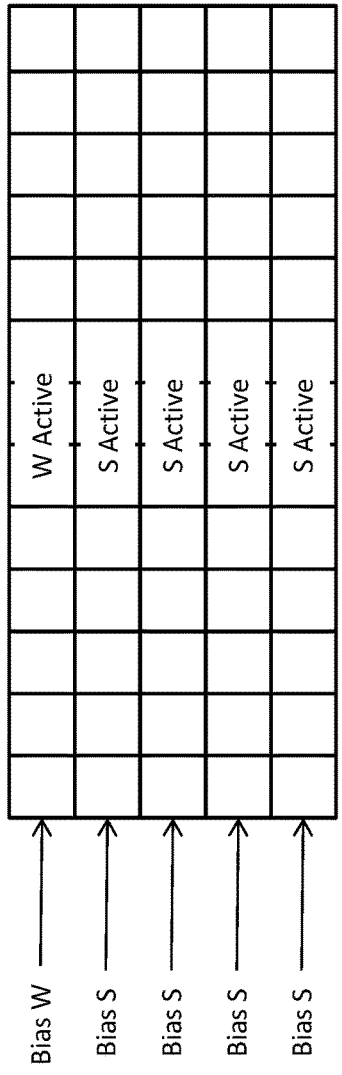
FIGS. 9A, 9B and 9C are block diagrams illustrating exemplary biasing configurations of an imaging array in accordance with embodiments of the disclosure.
Figure 9B:
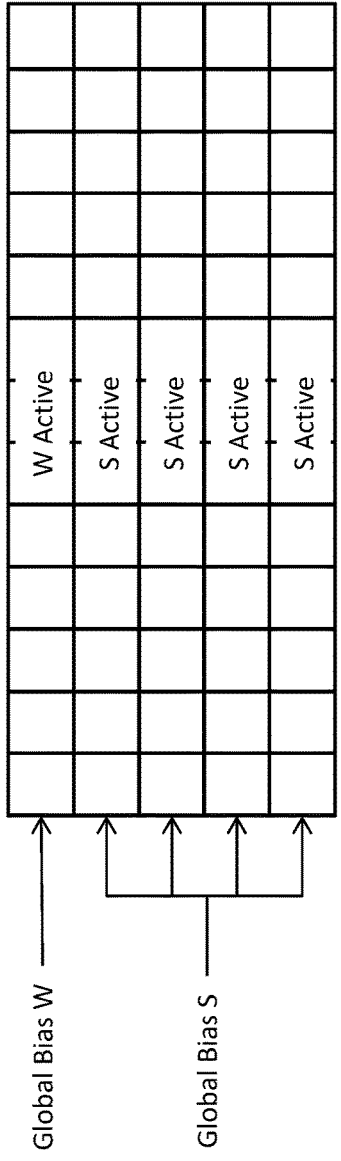
Figure 9C:
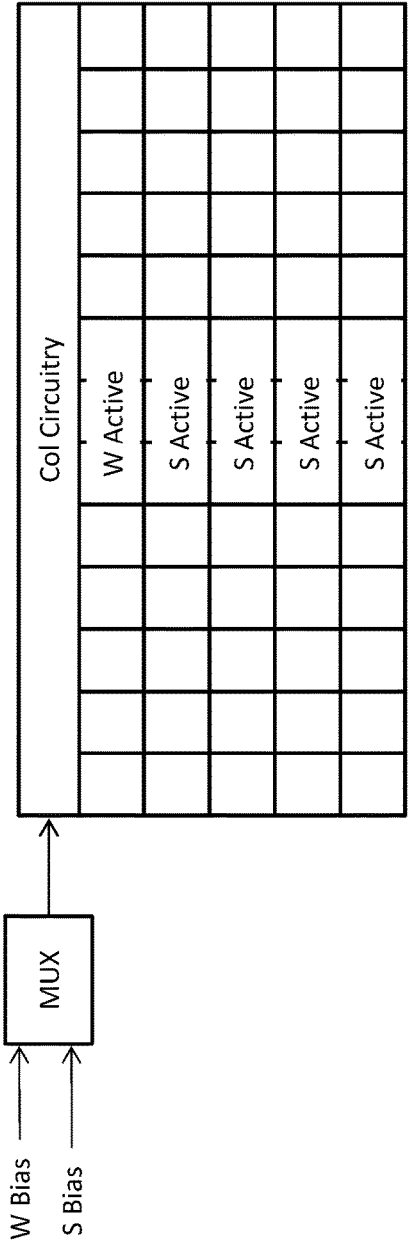

It is known that temperature compensation may be performed with some number of reference bolometers, although reference bolometers are not necessarily required. Thus, if temperature compensation is done per row as in in the example above, then 1 row of every super pixel will have wide spectral response reference bolometers for temperature compensation and the remaining (M−1) rows will have standard reference bolometers as indicated in FIGS. 9A and 9B. Rather than having a set of references for each row, 1 global set of wide spectral response reference bolometers (or circuitry) can be switched (MUX) for the 1 row of wide spectral response bolometers and another global set of standard reference bolometers (or circuitry) can be switched in for temperature compensation of the standard rows (FIG. 9C).

In various embodiments including image arrays having an M×N super pixel with only 1 wide spectral response bolometer, rows that include both wide spectral response bolometers (W) and standard bolometers (S) will include both sets of biases going through the row so that each of the different bolometers will have the appropriate biasing for temperature compensation. This may require extra circuitry and/or reference pixels in order to provide two different temperature compensation biases at the same time. Two such embodiments are depicted in FIGS. 10A and 10B.

Figure 10A:
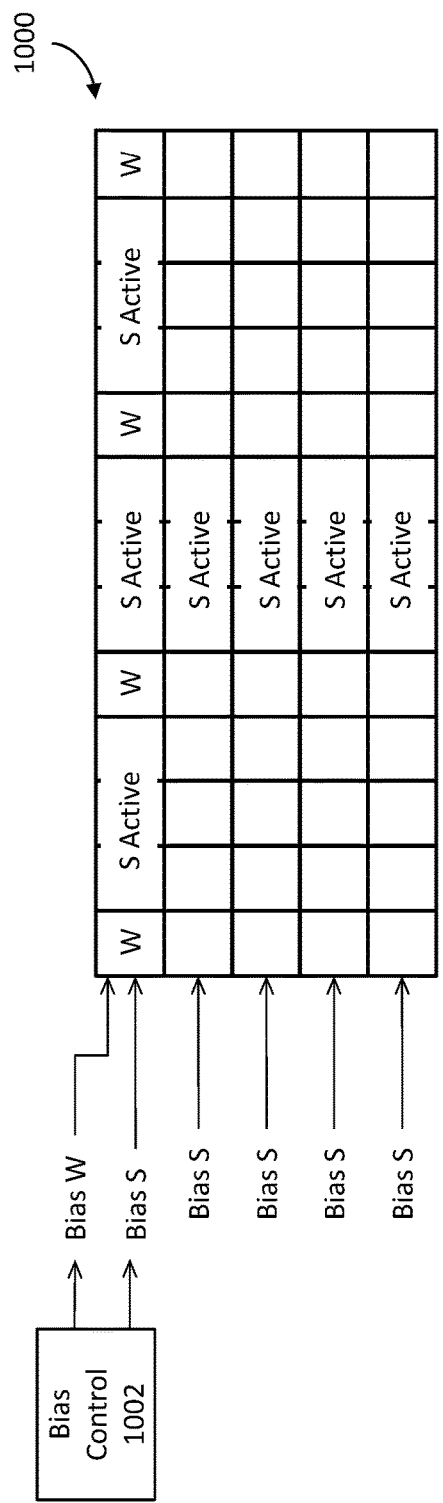
FIGS. 10A and 10B are block diagrams illustrating exemplary biasing configurations of an imaging array in accordance with embodiments of the disclosure.

FIG. 10A shows a block diagram of aspects of an exemplary microbolometer readout integrated circuit 1000 with bias-control circuitry 1002 in accordance with an embodiment of the present disclosure. The ROIC 1000 includes a microbolometer array comprising a plurality of S sensors arranged in rows and columns, with at least one row comprising one or more W sensors and controlled by bias control circuitry 1002. The ROIC 1000 may also include additional elements such as timing circuitry, cell addressing circuitry, amplifiers, analog-to-digital converters.

Figure 10B:
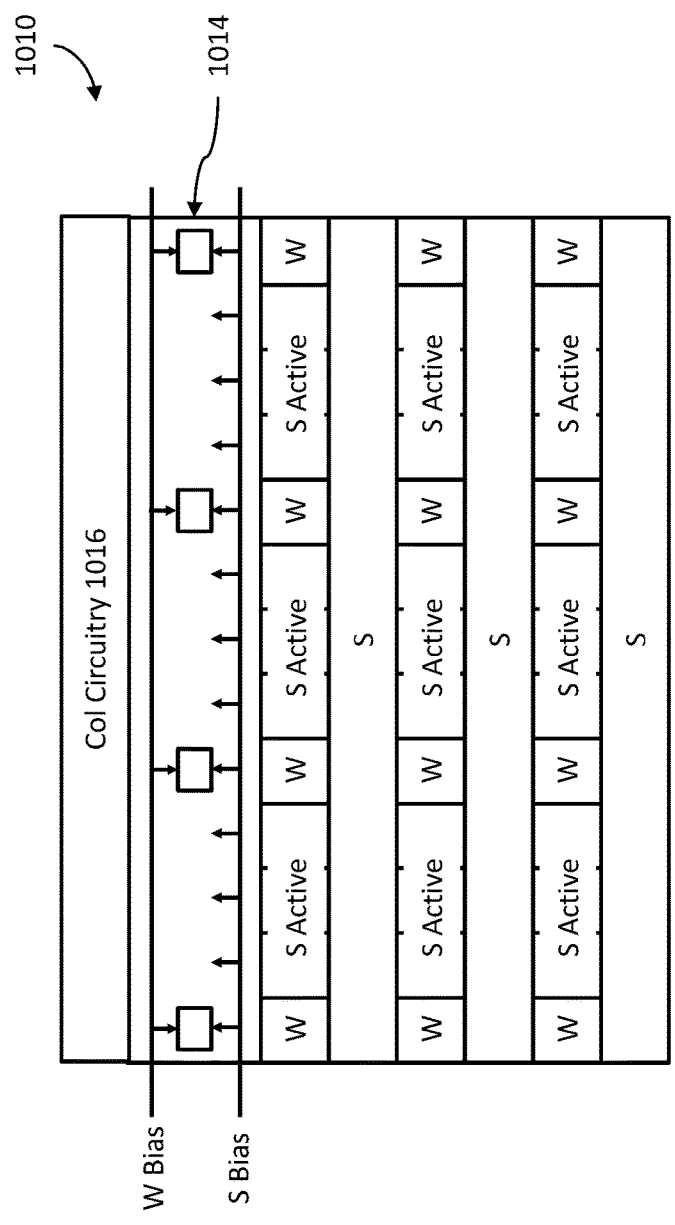

FIG. 10B shows a block diagram of aspects of an exemplary microbolometer readout integrated circuit 1010 with column control circuitry 1016 in accordance with another embodiment of the present disclosure. As illustrated, the ROIC 1010 includes a microbolometer array comprising a plurality of S sensors and W sensors arranged in rows and columns, with one W sensor in every 4×2 block. A multiplexer 1014 is provided for each column having both W and S sensors for switching between W and S bias as controlled by the column control circuitry 1016.

Although row based temperature compensation has been described, it will be appreciate that this temperature compensation could also be implemented at the column or pixel level, or a combination of row and column compensation. Also, while these examples focused on biasing the pixel, temperature compensation can also be performed by manipulating the bolometer response so that all S and W bolometers can be biased the same, but manipulation of the signal is done differently for W and S bolometers in order to maximize dynamic range for each.

Figure 11B:
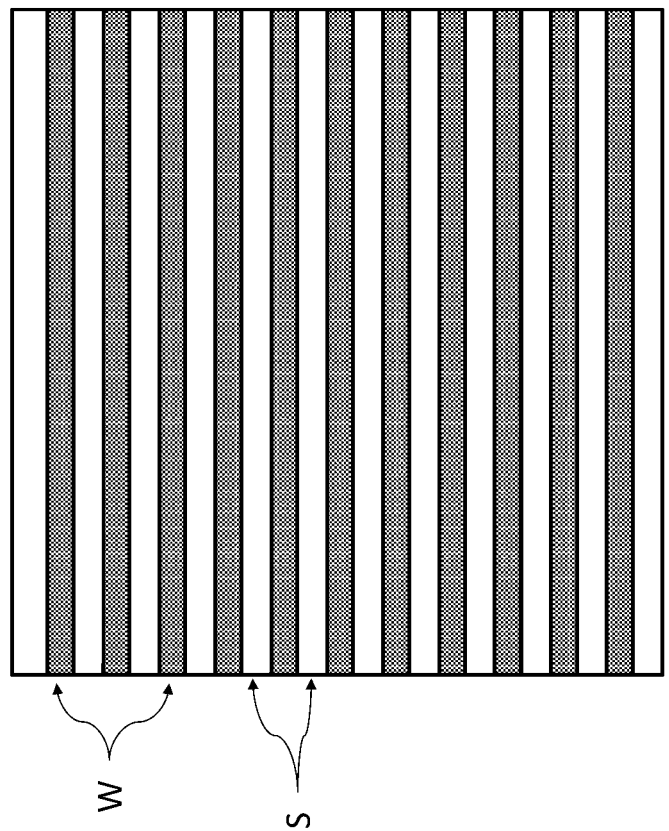
FIGS. 11A and 11B are block diagrams illustrating exemplary imaging arrays in accordance with embodiments of the disclosure.
Figure 11A:
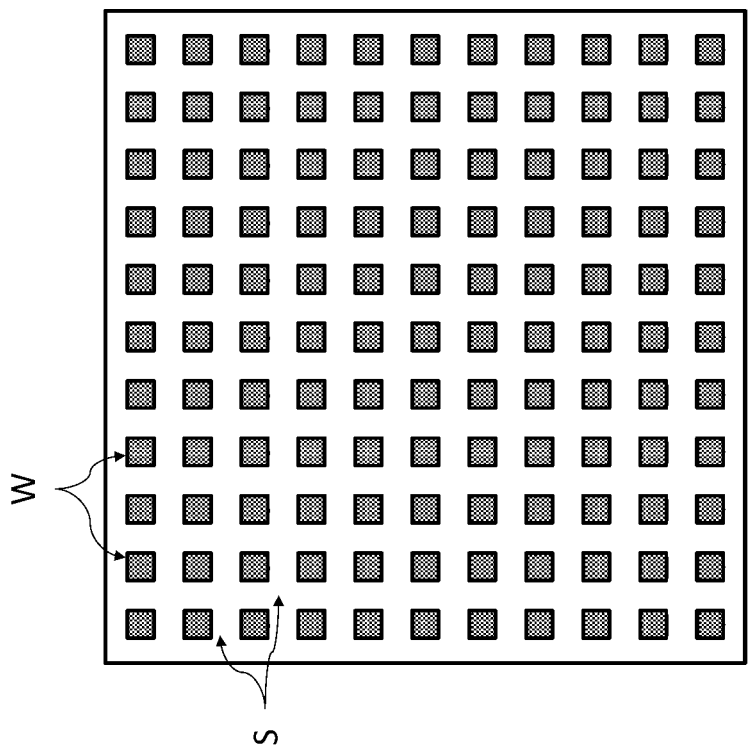

Various embodiments of configurations will now be discussed. In one embodiment, one or more of the two different spectral response tuned bolometers are coated as described herein to filter out electromagnetic radiation outside of their respective bands. As illustrated in FIGS. 11A and 11B, W pixels have higher sensitivity, and the remaining S pixels are standard pixels. Calibration of the image array may include correction on every other line, which would be applied to the next line. In some embodiments, biasing of a column would be difficult, because the compensation on-chip would be tuned for one bolometer or the other, not both.

In the embodiments described herein, two different spectral response tuned bolometers within the same array are described, but it will be appreciated that three or more different spectral response bolometers could be placed within each super-pixel. Each bolometer would be supplied with the appropriate bias or manipulation of the output signal, or a global setting for all bolometer types may be sufficient.

Figure 12:
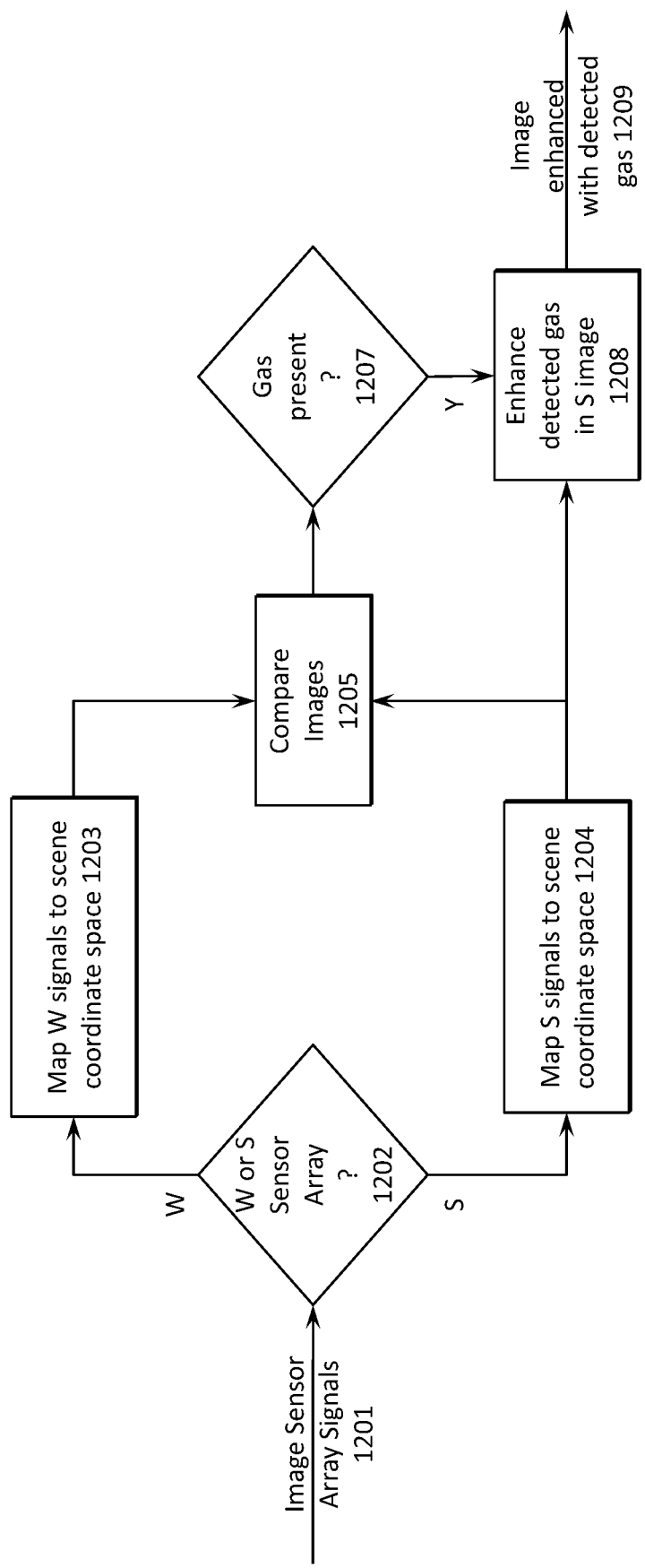
FIG. 12 is a flow chart illustrating an exemplary operation of a gas detection system in accordance with an embodiment of the disclosure.

An embodiment of an operation of various embodiments described herein will now be described with reference to FIG. 12. FIG. 12 illustrates a process of performing gas detection in accordance with embodiments of the disclosure. As discussed, the image sensor array described herein includes sensors having at least two spectral sensitivities. In one embodiment, the image sensor array includes standard response pixels and wide spectral response pixels, each detecting different bands of electromagnetic radiation. At step 1201, image sensor array signals are received, such as pixel values provided by the S and W sensors in response to detected electromagnetic radiation. In one embodiment, the standard response pixels, S, are optimized to detect the presence of gas within a frequency range, and the wide spectral response pixels, W, are configured with a spectral range that is outside the spectral range for detecting the desired gas.

In one embodiment, the sensor array may be configured to detect wide spectral bands, W, of electromagnetic radiation, and other sensor arrays may be configured to detect narrow spectral bands, S, of electromagnetic radiation. For example, the S bands may approximately match one of the absorption bands (e.g., wavelength ranges) of a known gas. And the W spectral band may be a band in which the gas is not detected.

Next, in step 1202, sensor array signals are processed for each of the sensor arrays. In this regard, samples corresponding to W sensor array signals are passed to block 1203 where the samples are mapped to a global W scene coordinate space. In this regard, each W sensor may be mapped to a corresponding coordinate of the W scene coordinate space, for example, by selecting a scene coordinate (e.g., pixel or pixels) having a center that closest matches the center of the corresponding sensor.

Samples corresponding to S sensor array signals are passed to block 1204 where the samples are mapped to a global S scene coordinate space. In this regard, each S sensor may be mapped to a corresponding coordinate of the S scene coordinate space, for example, by selecting a scene coordinate having a center that closest matches the center of the corresponding S sensor.

At block 1205, the mapped samples (e.g., pixel values) provided by the W sensor arrays for particular scene coordinates are compared to mapped samples provided by the S sensor arrays for the same scene coordinates. In one embodiment, the two mapped samples are subtracted and the difference between the two measures provides an indication of the presence or absence of gas at the particular location in the scene.

In one embodiment, if the difference between a scene coordinate value provided by the S sensor array and the W sensor array exceeds a gas detection threshold, then such value may indicate that a gas is present at the scene coordinate (block 1207). The presence of the gas may be indicated at the scene coordinate by processing the mapped samples (block 1208) to provide an image 1209 (e.g., a result image) that is, for example, highlighted or color coded at the scene coordinates corresponding to the identified gas.

In another embodiment, different S sensor arrays may detect S electromagnetic radiation in different narrow bands. For example, a first group of one or more S sensor arrays may detect S electromagnetic radiation in a first narrow band, and a second group of one or more S sensor arrays may detect S electromagnetic radiation in a second narrow band that differs from the first narrow band. Additional groups of S sensor arrays associated with other narrow bands may also be provided.

In another embodiment, one or more S sensor arrays may detect electromagnetic radiation in multiple narrow bands that match the absorption bands of multiple gases. In this case, multiple gases with different spectral properties may be detected. Gases may be detected with high accuracy using different S sensor arrays directed toward different spectral bands. For example, the different spectral bands may be associated with different absorption bands of the same gas. Thus, by using such different S sensor arrays in the process of FIG. 12, sample values (e.g., signal strength) provided by W sensor arrays may be compared with sample values provided by different S sensor arrays 202 for different spectral bands.

In one embodiment, each S spectral band has an associated W sensor array, having a band outside the gas detection range of the gas of interest in the S spectral band. In another embodiment, a single W sensor array is selected for a plurality of S spectral bands. Thus, if a gas has multiple absorption bands, then the detection of such bands using the different spectral bands may increase the accuracy of gas detection and reduce the likelihood of false detections (e.g., due to multiple gases or materials sharing an identical or similar absorption band).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Where applicable, the ordering of various steps described herein can be changed, combined into composite steps, and/or separated into sub-steps to provide features described herein.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the disclosure. It should also be understood that numerous modifications and variations are possible in accordance with the principles of the disclosure. Accordingly, the scope of the present disclosure is defined only by the following claims.

What is claimed is:

1. An infrared (IR) camera system for optical gas detection, comprising:
an optical path comprising a lens assembly comprising a set of lens elements having at least one lens coating that allows at least 90% transmission of IR radiation within a particular range of wavelengths through the set of lens elements, and a filter that blocks IR radiation outside of the particular range of wavelengths, wherein the particular range of wavelengths corresponds to a detection range for a gas; and
an imaging sensor comprising an array of sensor pixels having a pixel pitch larger than 15 micrometers, wherein the imaging sensor is configured to detect IR radiation and image the gas transmitted to the imaging sensor via the optical path;
wherein the imaging sensor further comprises a plurality of super pixels, each super pixel comprising a plurality of narrow wavelength sensors operable to image the gas in a first spectral bandwidth and at least one wide spectral bandwidth sensor operable to sense infrared radiation in a second bandwidth where the gas is substantially undetectable.

2. The IR camera system of claim 1, further comprising a radiation inlet coupled with the lens assembly, wherein the radiation inlet has an aperture with a focal ratio less-than or equal to f/2 in relation to a focal length associated with the set of lens elements.

3. The IR camera system of claim 1, wherein the imaging sensor is operable to produce image data of a scene, wherein the IR camera system further comprises a logic device operable to:
receive, from the imaging sensor, the image data comprising pixel data from the array of sensor pixels;
divide the array of sensor pixels into a set of pixel groups, wherein each pixel group comprises at least two adjacent pixels;
compute, for each pixel group in the set, an average pixel value based on pixel data of the pixels in the pixel group; and
generate an image frame based on computed average pixel values.

4. The IR camera system of claim 3, wherein the logic device is further operable to:
generate at least two image frames of the scene; and
produce an average frame by taking an average of the at least two image frames of the scene.

5. The IR camera system of claim 3, wherein the logic device is further operable to apply a noise reduction filter to the image frame.

6. The IR camera system of claim 1, wherein the array of sensor pixels is adapted to capture an image of a scene based on infrared radiation received through the lens assembly; and
wherein the IR camera system further comprises:
a read-out integrated circuit (ROIC) operable to provide a first image sensed by the first array and a second image sensed by the second array; and
gas detection logic operable to detect a presence of the gas in the first image, by computing a difference between pixel values of the first image and corresponding pixel values of the second image.

7. The IR camera system of claim 6, wherein the first array of sensors has a spectral bandwidth corresponding to a response sensitivity for detecting the gas.

8. The IR camera system of claim 6, wherein the first array of sensors is operable to sense a range of wavelengths between 7.0 and 8.5 micrometers or a range of wavelengths having a lower bound above 8.5 micrometers.

9. The IR camera system of claim 1, wherein the imaging sensor comprises an array of micro-bolometers including an optical cavity structure tuned to a spectral band corresponding to the gas to be detected.

10. A method of configuring an uncooled infrared (IR) camera having a set of lens elements, a filter, and an imaging sensor for gas detection, the method comprising:
providing, on the imaging sensor, an array of sensor pixels having a pixel pitch of greater than or equal to 20 microns, wherein the imaging sensor is configured to detect IR radiation from, and a image, a gas;
applying, on the set of lens elements, at least one coating that allows at least 90% transmission of IR radiation within a particular range of wavelengths through the set of lens elements towards the imaging sensor, wherein the particular range of wavelength corresponds to a detection range for the gas; and
configuring the filter to block IR radiation outside of the particular range of wavelengths;
wherein the array of sensor pixels further comprises a plurality of super pixels, each super pixel comprising at least one wide spectral bandwidth sensor operable to image the scene in a spectral band corresponding to the gas to be detected and a plurality of narrow spectral bandwidth sensors operable to image the scene in a spectral band in which the gas is not detectable.

11. The method of claim 10, further comprising applying, on a detector window of the imaging sensor, the at least one coating.

12. The method of claim 10, wherein the set of lens elements has a focal length, the method further comprising providing, between the set of lens elements and the imaging sensor, a radiation inlet having an aperture with a focal ratio less than or equal to f/2 with respect to the focal length.

13. The method of claim 10, wherein the imaging sensor is configured to capture image data of a scene, wherein the method further comprises configuring a logic device to perform operations comprising:
retrieving the image data comprising pixel data from the array of sensor pixels of the imaging sensor;
dividing the array of sensor pixels into a set of pixel groups, wherein each pixel group comprises at least two adjacent pixels;
computing, for each pixel group in the set, an average pixel value based on pixel data of the pixels in the pixel group; and
generating an image frame based on the average pixel values.

14. The method of claim 10, wherein the method further comprises:
generating a first image sensed by the wide spectral bandwidth sensors and a second image sensed by the narrow spectral bandwidth sensors; and
detecting a presence of the gas in the first image by computing a difference between pixel values of the first image and corresponding pixel values of the second image.

15. The method of claim 14 wherein the second array of the plurality of sensor pixels has a bandwidth that is outside a detectable range for the gas to be detected by the first array of sensors.

16. The method of claim 14 wherein the image sensor comprises a plurality of super pixels, each super pixel comprising at least one sensor operable to image the scene in a spectral band corresponding to the gas to be detected and a plurality of narrow sensors operable to image the scene in a spectral band in which the gas is not detectable.

17. The method of claim 14, wherein the first array of the plurality of sensor pixels is operable to sense a range of wavelengths between 7.0 micrometers and 8.5 micrometers or a range of wavelengths having a lower bound above 8.5 micrometers.

18. The method of claim 14, wherein generating the first image and the second image comprises generating an output an output using a readout integrated circuit communicatively coupled with the imaging sensor.

19. The method of claim 14, wherein the imaging sensor comprises an array of micro-bolometers having an optical cavity structure tuned to the spectral band corresponding to the gas to be detected.

* * * * *

UNITED STATES PATENT AND TRADEMARK OFFICE
CERTIFICATE OF CORRECTION

| | | |
|---|---|---|
| PATENT NO. | : 11,635,370 B2 | |
| APPLICATION NO. | : 16/586809 | |
| DATED | : April 25, 2023 | |
| INVENTOR(S) | : Hakan E. Nygren et al. | |

It is certified that error appears in the above-identified patent and that said Letters Patent is hereby corrected as shown below:

In the Specification

In the Detailed Description:

Column 9, Line 10, change "8.5 µM." to --8.5 µm.--.

Signed and Sealed this
Twentieth Day of June, 2023

Katherine Kelly Vidal
*Director of the United States Patent and Trademark Office*